Figure 1:
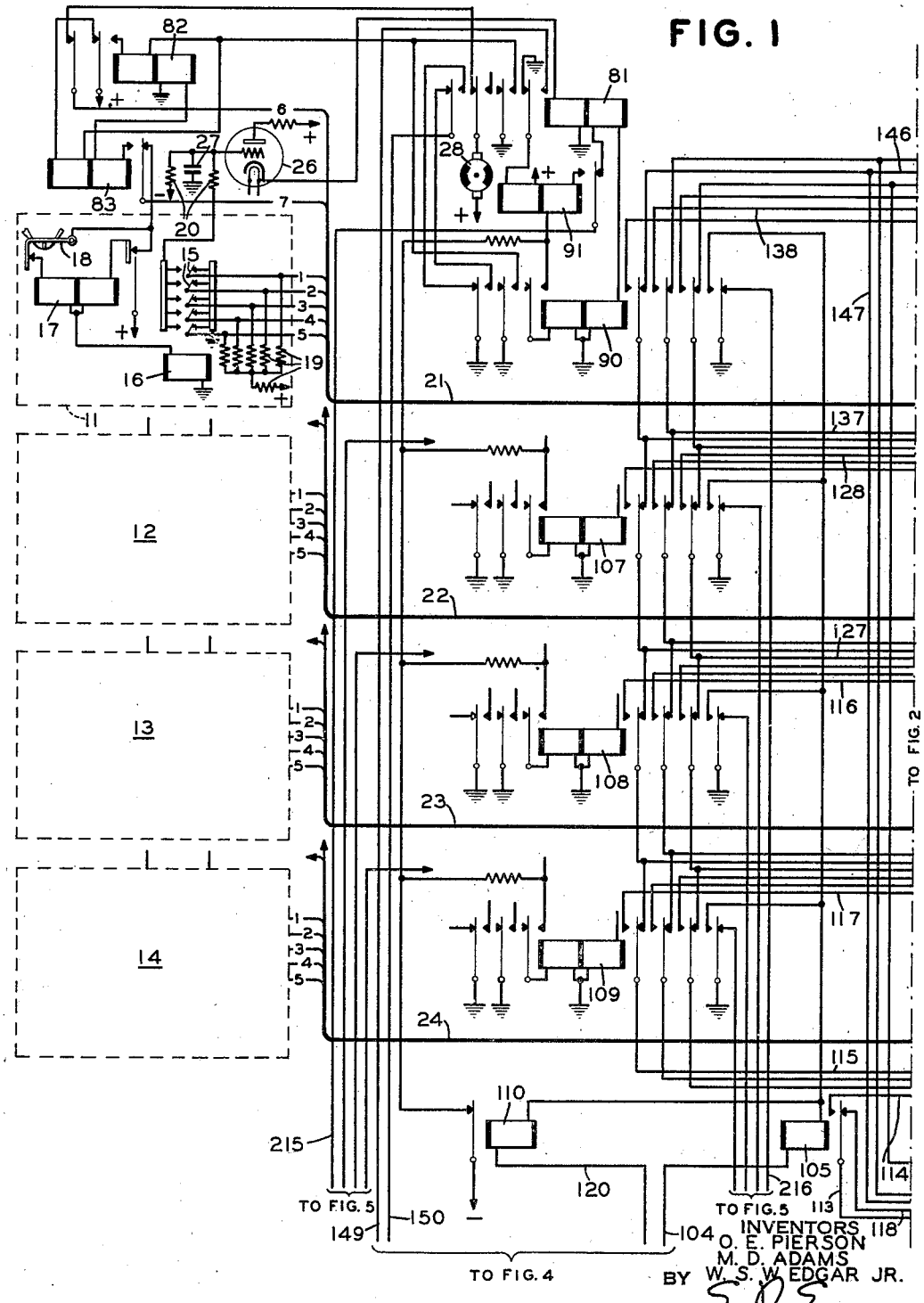

May 12, 1942.　　O. E. PIERSON ET AL　　2,282,341
MULTICHANNEL TELEGRAPH SYSTEM
Filed Dec. 8, 1939　　12 Sheets-Sheet 1

INVENTORS
O. E. PIERSON
M. D. ADAMS
BY W. S. WEDGAR JR.
ATTORNEY

INVENTORS
O. E. PIERSON
M. D. ADAMS
BY W. S. W. EDGAR JR.
ATTORNEY

May 12, 1942.   O. E. PIERSON ET AL   2,282,341
MULTICHANNEL TELEGRAPH SYSTEM
Filed Dec. 8, 1939   12 Sheets-Sheet 8
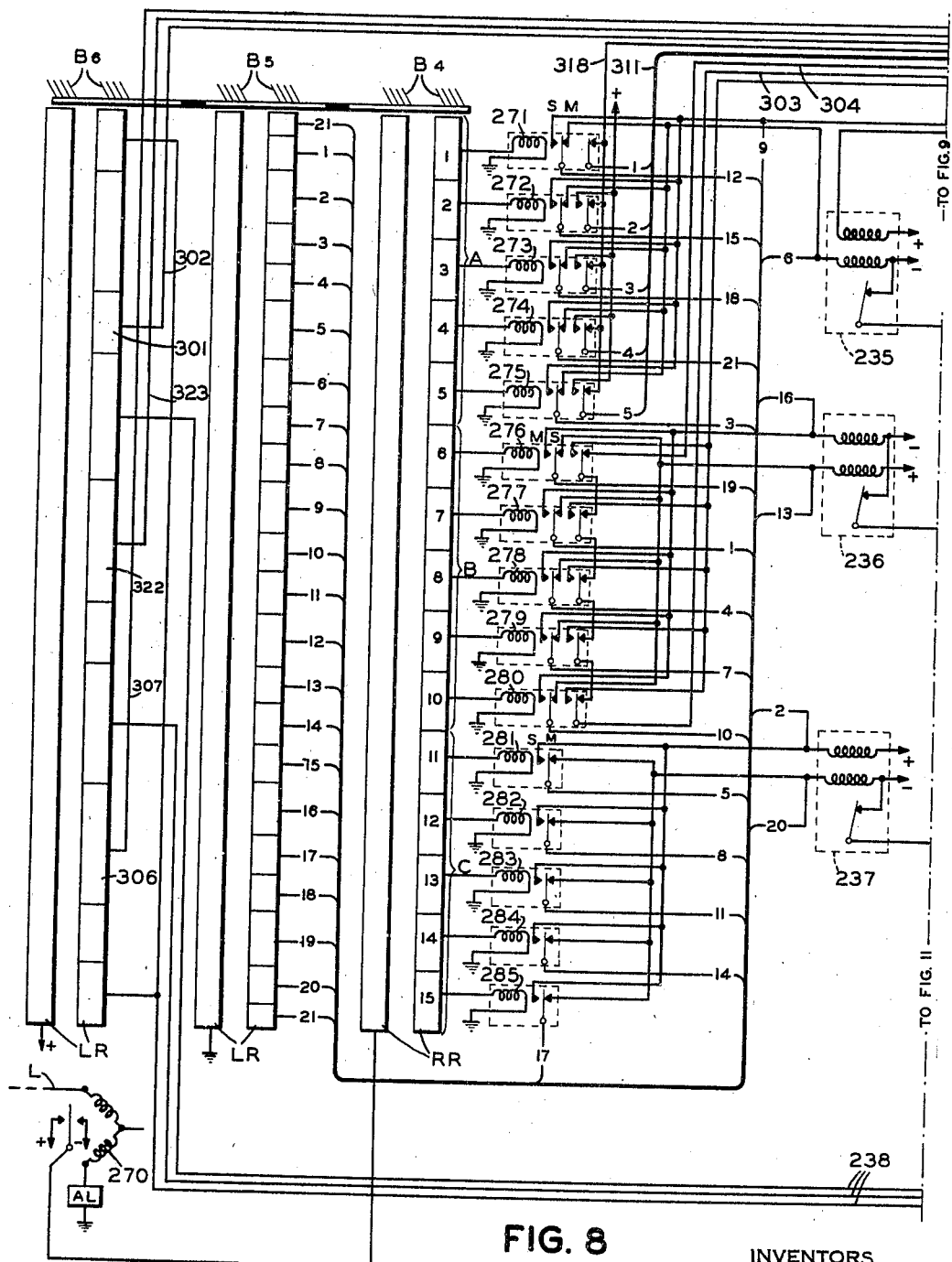
FIG. 8
INVENTORS
O. E. PIERSON
M. D. ADAMS
BY W. S. W. EDGAR JR.
ATTORNEY May 12, 1942.  O. E. PIERSON ET AL  2,282,341
MULTICHANNEL TELEGRAPH SYSTEM
Filed Dec. 8, 1939   12 Sheets-Sheet 9

INVENTORS
O. E. PIERSON
M. D. ADAMS
BY W. S. W. EDGAR JR.
ATTORNEY

May 12, 1942.  O. E. PIERSON ET AL  2,282,341
MULTICHANNEL TELEGRAPH SYSTEM
Filed Dec. 8, 1939    12 Sheets-Sheet 11

FIG. II

INVENTORS
O. E. PIERSON
M. D. ADAMS
BY W. S. W. EDGAR JR.
ATTORNEY

May 12, 1942.  O. E. PIERSON ET AL  2,282,341
MULTICHANNEL TELEGRAPH SYSTEM
Filed Dec. 8, 1939    12 Sheets-Sheet 12

INVENTORS
O. E. PIERSON
M. D. ADAMS
BY W. S. W. EDGAR JR.
ATTORNEY

Patented May 12, 1942

2,282,341

UNITED STATES PATENT OFFICE 2,282,341

MULTICHANNEL TELEGRAPH SYSTEM

Oscar E. Pierson, Brooklyn, and Myron D. Adams and William Stanley Westerman Edgar, Jr., New York, N. Y., assignors to The Western Union Telegraph Company, New York, N. Y., a corporation of New York Application December 8, 1939, Serial No. 308,226

28 Claims. (Cl. 178—52)

This invention relates to signalling systems and more particularly to expanding-channel or varioplex telegraph systems, the present application relating to an improvement upon the system disclosed and claimed in the prior patent to Pierson and Adams, No. 2,233,347, granted February 25, 1941.

The term "expanding-channel" or "varioplex" system as used herein refers to a system in which a variable number of telegraph transmitting subchannels share a common lane of traffic, substantially the entire lane time in the preferred system being divided among the operating transmitters or subchannels. The system thus distributes the use of the lane of traffic which may consists of one or more channels of a synchronous multiplex system among any busy combination of a number of traffic sources or telegraph transmitters. While the lane of traffic referred to generally comprises a channel or channels of a multiplex system, any equivalent communication system may be utilized, such as one or more radio or carrier channels or one or more cable conductors or a direct wire or combinations of different types of communication channels. Hence, the expression "lane of traffic" as used herein designates any suitable route or medium over which signalling is accomplished.

The expanding channel system thus comprises a multichannel system in which the number of subchannels operating over the connecting circuit or lane of traffic may be expanded or contracted by cutting in or out simultaneously transmitting and receiving devices at opposite ends of the system. The present invention relates particularly to a printing telegraph system of this character in which message characters are sent from operating transmitters in sequence and printed on the corresponding receiving devices, one busy subchannel being rendered operative after another while omitting the idle or inoperative subchannels.

One object of the invention is to provide an improved control system for simultaneously cutting in or out the opposite ends of each subchannel when such subchannel has traffic to send or has completed the transmission of waiting traffic.

Another object of the invention is to provide improved means for detecting failure of the control mechanism to cut in or out one end of a subchannel or to detect the false or accidental cutting in or out of a subchannel.

Another object of the invention is to provide an improved channel switching system in which telegraph subchannels are connected to or disconnected from a transmission circuit or lane of traffic in response to switching signals and in which a plurality of channels may be controlled by a single group of impulses forming a single code combination.

Another object of the invention is to provide a channel switching system having improved means for detecting and/or controlling transmission in response to failure of the line circuit or connecting lane of traffic, or distortion of signals transmitted thereover.

Another object of the invention is to provide in a system of the character described means for automatically stopping transmission if a subchannel fails to be cut in or cut out in response to the proper control signal.

Figure 10:
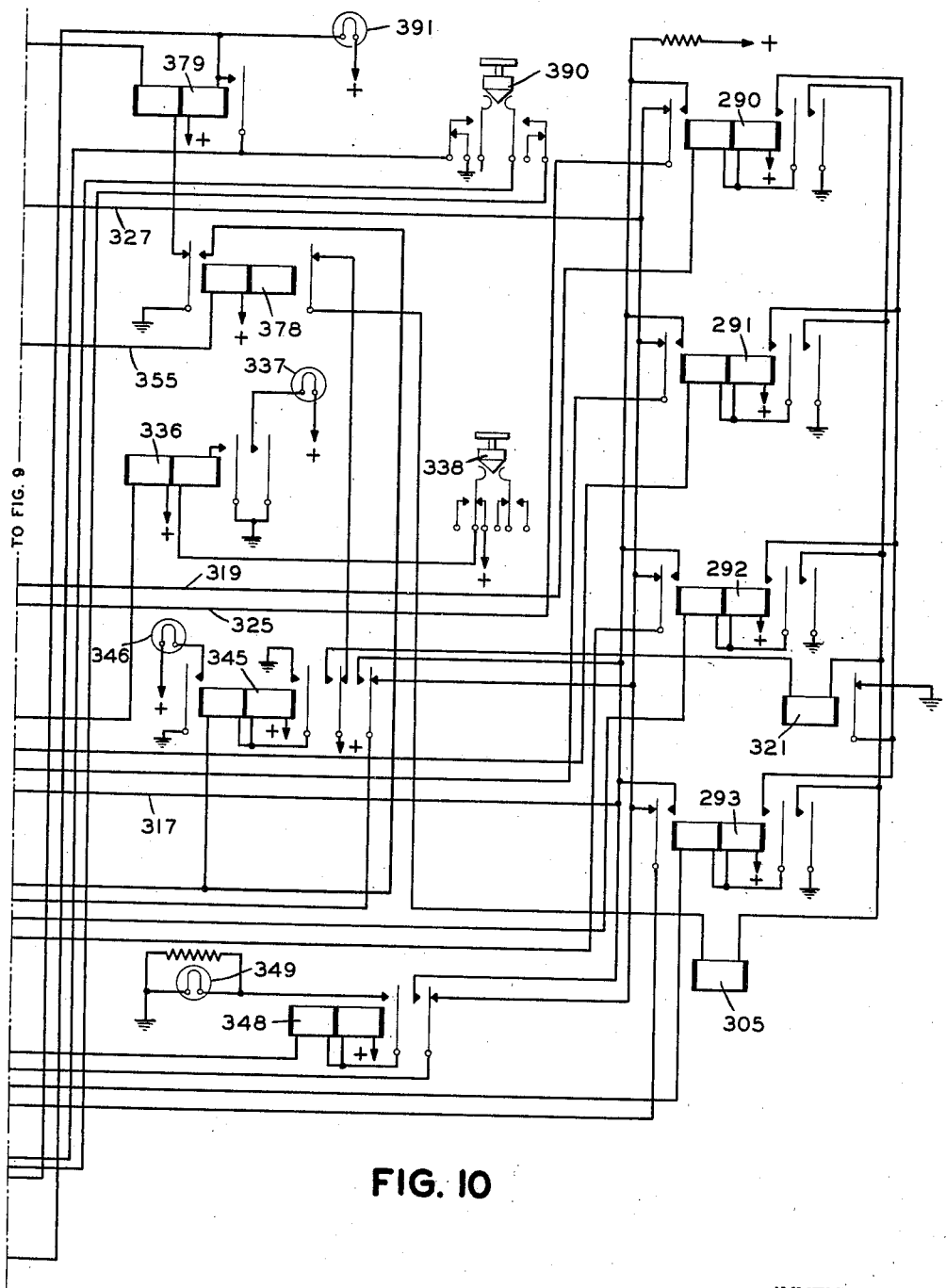
Figure 11:
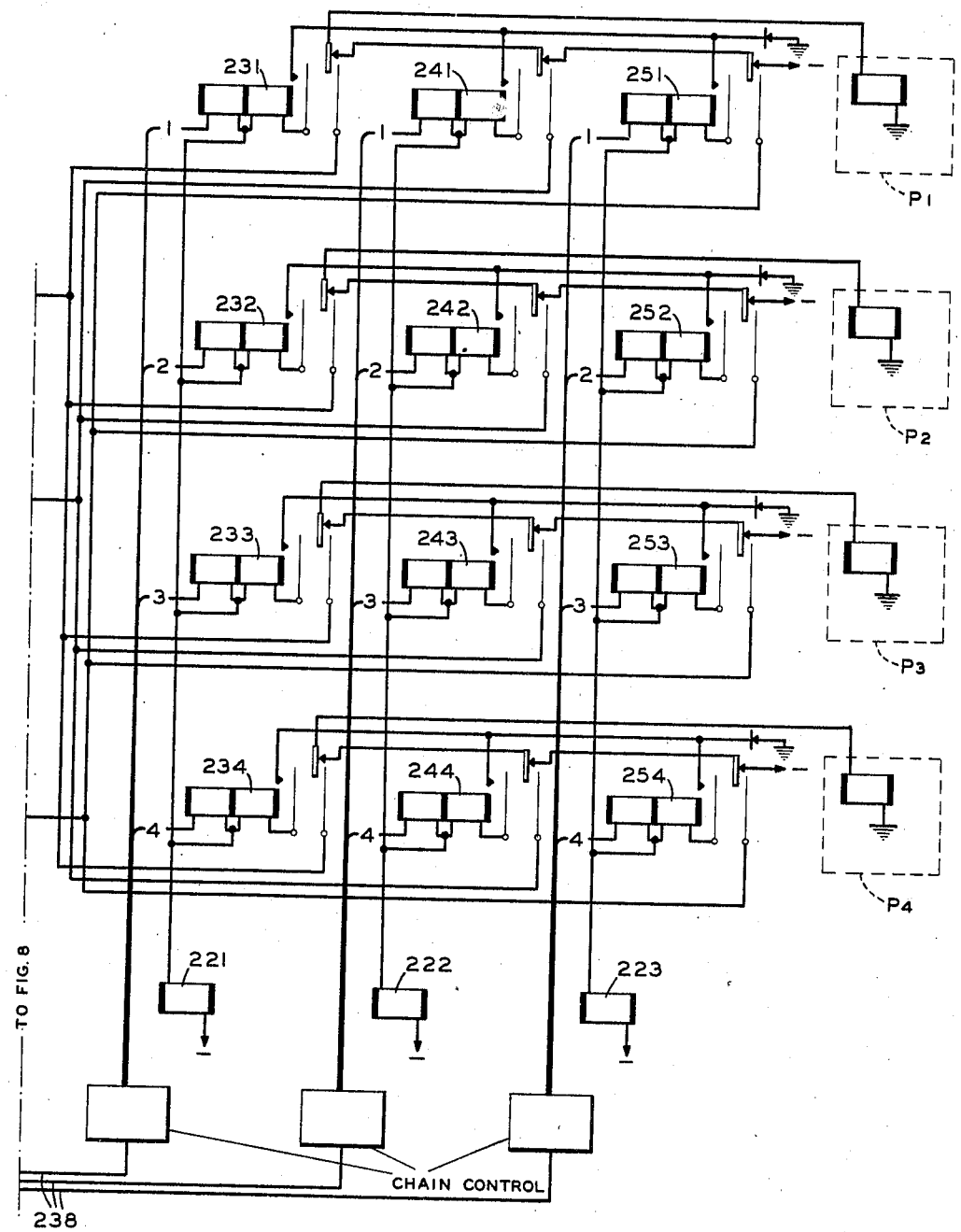
Figure 12:
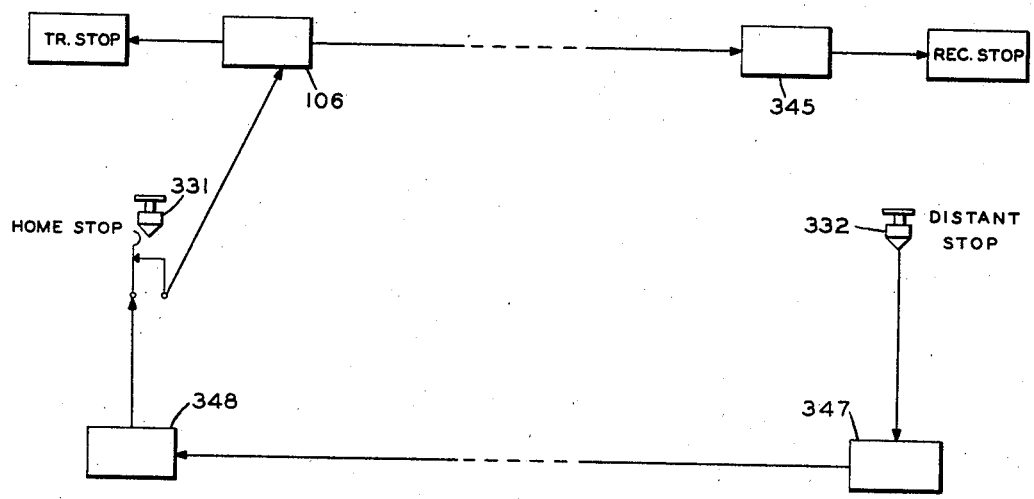
Figure 13:
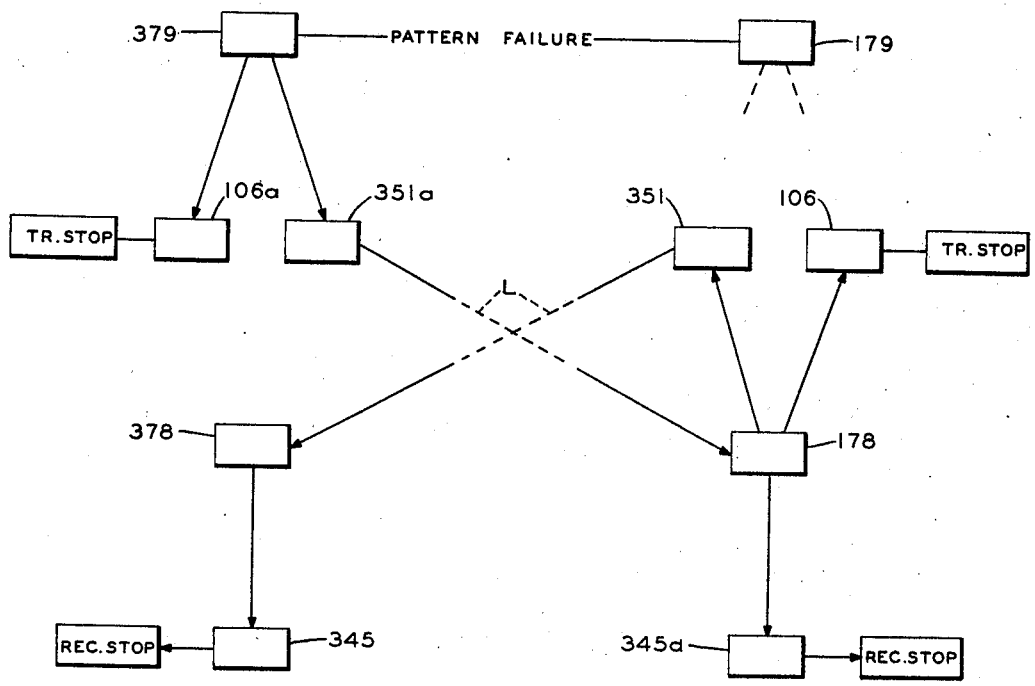

Other objects and advantages of the invention will appear from the following description of the preferred embodiment thereof shown in the accompanying drawings wherein:

Figs. 1 to 7, inclusive, form a circuit diagram of the transmitting apparatus at one end of the system;

Figs. 8 to 11, inclusive, form a circuit diagram of the receiving apparatus at the other end of the system; and Figs. 12 and 13 are simplified diagrams illustrating certain features of the system.

It will be understood that the complete system ordinarily includes transmitting and receiving apparatus at each office, the receiving apparatus at the first office being similar to that shown in Figs. 8 to 11, and the transmitting apparatus at the second office being similar to that shown in Figs. 1 to 7.

The system illustrated for the purpose of explaining the invention comprises a plurality of sources of signals represented by tape transmitters (see Fig. 1) adapted to share three channels of a synchronous multiplex system and to operate corresponding printers at the receiving office (see Fig. 11). A relay chain is arranged to connect the operative transmitters one after the other to the multiplex system at the transmitting office and a similar connector relay chain or mixer is provided for connecting the printers to the same channels of the multiplex system at the same time at the receiving office. If three or less than three subchannels are in operation the connector relays of the relay chain connect such subchannels to a corresponding number of multiplex channels and no stepping of the relay chain occurs. If, however, more than three subchannels are in operation the connector relays operate in such sequence as to connect the operative subchannels one after the other to the three multiplex channels in a manner generally similar to the operation of the relay chain described in the above mentioned patent of Pierson and Adams.

The transmission apparatus is preferably operated at high speed for operating economy and efficiency, and in a system of this character the connecting circuit may be of considerable length, for example, several hundred miles or more, and may include one or more telegraph repeaters. It will be obvious that in an extensive system of this character it is impossible to avoid occasional signal failures resulting from faulty circuits or apparatus or from atmospheric disturbances or induction. Since the relay chains at the transmitting and receiving offices must operate in synchonism and provide for the connection of varying numbers of subchannels, a signal must be transmitted to the receiving office whenever a subchannel is to be cut in or out of service in order to effect this function simultaneously at both offices. Since this switching signal is transmitted over the same channel or lane of traffic employed for communication and is similar in certain respect to the code signals used to control the receiving printers, the distortion or failure of a signal or group of code signals may cause either a false switching signal or the loss of a switching signal. Since this occasional failure cannot be avoided in actual practice at the high transmitting rates required for efficient operation, it is necessary to provide means for detecting false switching signals or the failure of a switching signal.

In the system illustrated for the purpose of explaining the invention, switching signals are transmitted whenever a change in the subchannel pattern occurs and rotary step-by-step control switches are employed at the sending and receiving offices, respectively, for controlling the cutting in and out of subchannels from the system. These sending and receiving control switches move in synchronism so as to control the same groups of subchannels at the opposite ends of the system. An additional step-by-step switch at the sending end is also utilized to control the transmission of a signal pattern and for other purposes.

The switching signals are transmitted on the A and B multiplex channels and during such transmission it is necessary, to interrupt any normal traffic which would otherwise be sent on those channels. The signals sent consist of characters on the B channel which are always blanks and characters on the A channel designated as patterns and confirmations, each pattern being followed by a confirmation. The pattern character by the location of its marking or spacing elements causes the cut-in control relays of the respective subchannels to be operated or released. The confirmation character performs the function of checking the operations performed by the pattern. A blank is also sent on the B channel at the time the switches at the sending end step from their home positions. This blank is used at the receiving end to start the receiving control switch and to check various features of operation. If a subchannel is to be cut in or cut out, a blank is sent on the B channel at the proper time during the rotation of the control switches, followed by pattern and confirmation signals on the A channel and another blank on the B channel. The first blank on the B channel causes the receiving switch and its associated relays to read for the pattern and confirmation on the A channel. The term "pattern" is employed with reference to the signal sent to cause the cutting in or out of the subchannel. Of the five pulses in each pattern character, four are employed to operate the cut-in control relays and the fifth pulse is used to stop the circuit under certain conditions of failure. The latter will be considered later. The pattern pulses which are received marking cause the receiving cut-in control relays to be operated and those received spacing cause the corresponding relays to be released so that any single pattern group may cut in or out four subchannels.

The particular subchannel which will be controlled by any pattern pulse will be determined first, by the location of that pulse among the four which make up the pattern and second, by the number of steps the pattern switch has taken from its home position. The sending pattern and control switches are started by the closing of a common test circuit when one of the subchannels is to be changed from the inoperative to the operative condition or vice versa, and as the switches step they test each group of four subchannels to determine whether any subchannel in that group is to be cut in or out. When the switches reach a contact stud corresponding to a group of which at least one subchannel is to be cut in or out, pattern and confirmation signals are sent which of course may cut in or out up to four subchannels upon sending the pattern and confirmation signals of a group only once.

In the initial movement of the step-by-step switches a blank is sent on the B channel which is followed by a guard character on the A channel during the following revolution of the distributor brushes. The guard character consists of some combination of marking and spacing pulses which are transmitted each time the sending pattern and control switches rotate and this guard character is tested for accurate reception at the receiving end. The receiving control switch starts to step upon receiving said blank on the B channel and then causes control relays to read for the guard character on the A channel. In a large telegraph system a number of varioplex systems having line terminals at a single office may be employed. In starting up these systems it may be possible to accidentally connect the terminals to the wrong systems which would cause the transmitted signals to be sent to the wrong receiving printers. Therefore different guard characters are selected for the different varioplex systems and the failure to receive the proper guard character is arranged to stop transmission. In this manner the system is arranged so that the subchannels of one varioplex system are prevented from working into the subchannels of another system.

The confirmation signal following each pattern signal bears a predetermined relation to the pattern signal and the system is automatically stopped if the proper confirmation signal is not received. The first pulse of each pattern signal is normally sent spacing but is changed to marking when the circuit is to be stopped. The remaining pulses of the pattern control groups control the four subchannels of that group and thus may be either marking or spacing. The first pulse of the confirmation signal is normally sent spacing and is used in conjunction with the first pulse of the pattern signal. The second, third, fourth and fifth pulses of each confirmation signal are sent with their polarities opposite that of the second, third, fourth and fifth pulses of the pattern signal and are used at the receiving end to confirm the accurate reception of the pattern. Thus if the confirmation signal does not check the previous pattern signal, transmission over the system is stopped.

The confirmation signal is also arranged to check the positions of the chain control relays which should have been operated by the previous pattern signal and thus determine whether the proper subchannels have been cut in or out. If the confirmation signal does not check the positions of the receiving chain control relays set up by the pattern signal, transmission is stopped. The confirmation signal also check the loss of synchronism between the sending and receiving control switches so that the transmission is stopped if the switch at one end of the system gets out of step with the control switch at the other end. The system is further arranged to transmit pattern signals at predetermined time intervals even though there is no change in the pattern of the subchannels. If no pattern signal is received for a predetermined time greater than the normal interval referred to which might result from failure of the line circuit or other causes, the system is shut down.

The system may also be provided with suitable regulating signals and the like for the use of the attendants at the respective offices. Manual control keys for shutting down the system or effecting other control functions at will may also be provided as set forth in detail below.

Figure 2:
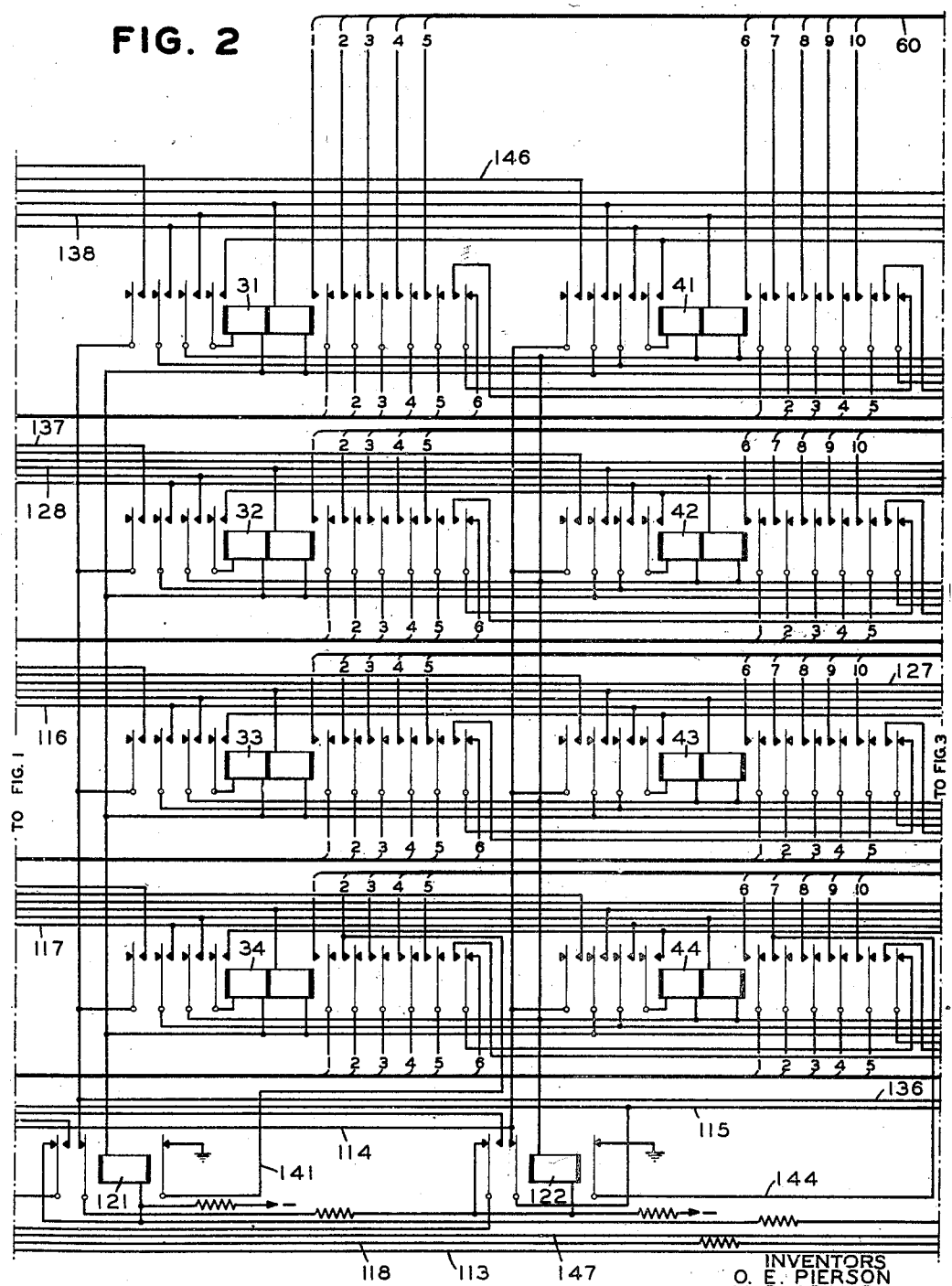
Figure 3:
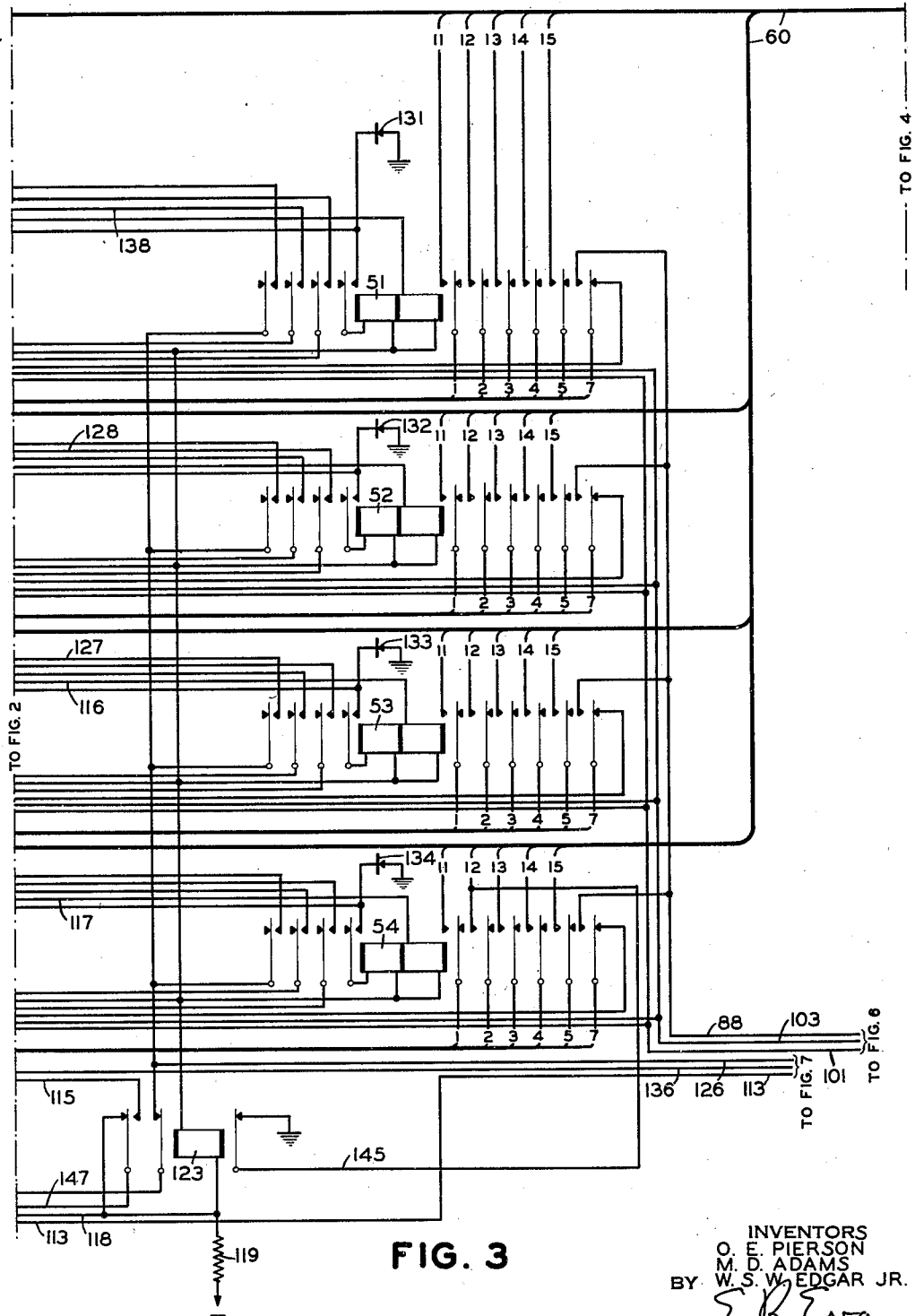
Figure 9:
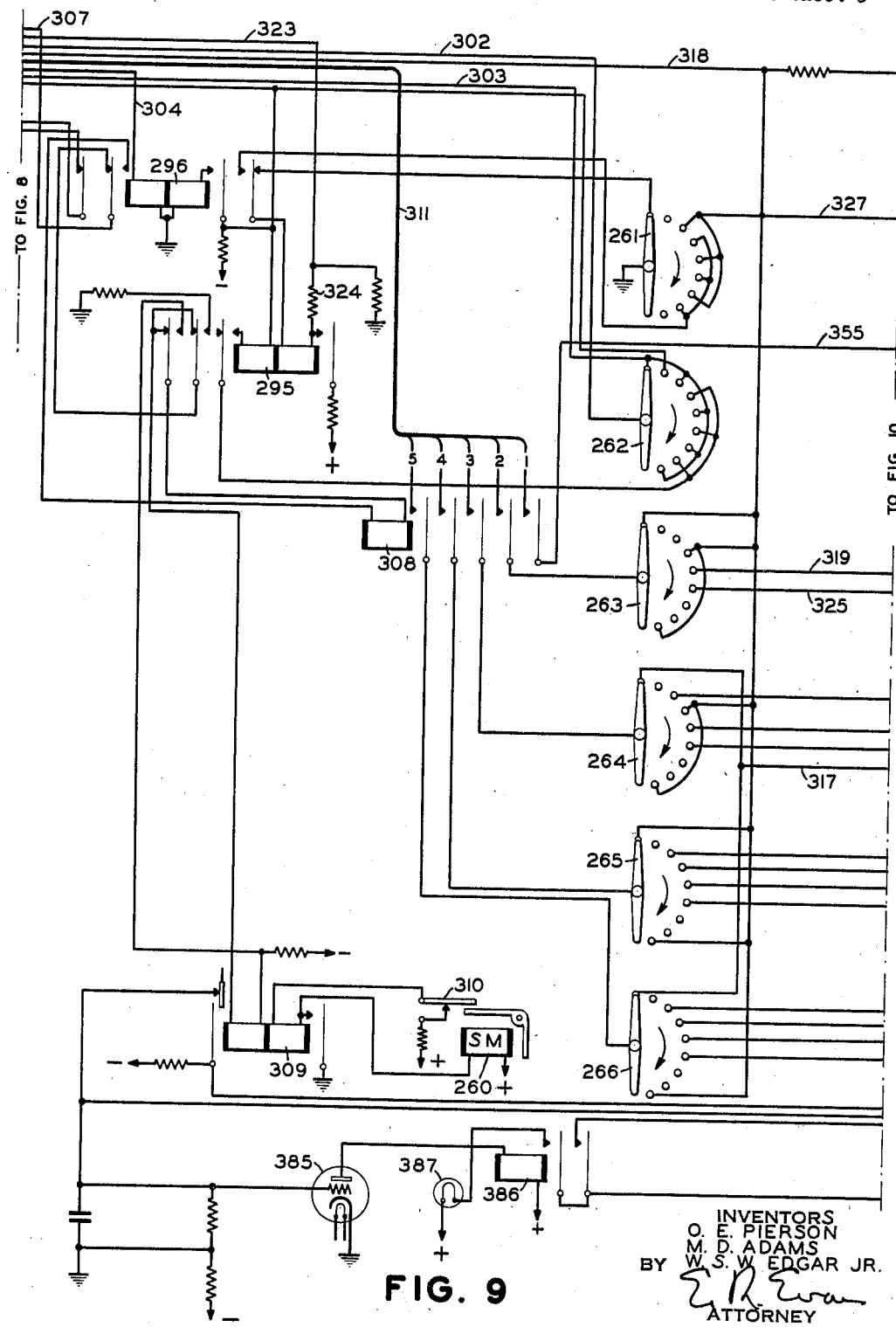

Referring to Figs. 1 to 11 of the drawings, the transmitting ends of four subchannels are shown in Fig. 1 and corresponding printers or receiving devices in Fig. 11. The connector relay chain for connecting the transmitters to the lane of traffic is shown in Figs. 1, 2 and 3. The lane of traffic is shown for purposes of illustration as a three-channel synchronous multiplex system comprising transmitting and receiving distributors shown in Figs. 7 and 8 and associated with line circuit L arranged for full duplex operation in the conventional manner. Signals received at the receiving distributor are connected, through a connector relay chain shown in Fig. 11 and similar to that at the transmitting station, to the printers P1 to P4. The auxiliary signalling and control apparatus includes two step-by-step control switches at the transmitting station shown in Fig. 5, one of which is hereinafter referred to as a "pattern" switch. At the receiving end a similar step-by-step switch shown in Fig. 9 is provided which is operated in synchronism with the control switch at the transmitting end of the system so that corresponding functions may be effected simultaneously at opposite ends of the system. The detailed operation of the system is as follows:

Subchannel circuits

The transmitting apparatus of four subchannels is represented at 11, 12, 13 and 14 in Fig. 1. The tape transmitter at the transmitting end of each subchannel and intended to represent any suitable source of signals comprises adjustable contacts 15 positioned in accordance with the perforations in the tape and stepping magnet 16 for advancing the tape through the transmitter. The construction of the tape transmitter may be similar to that disclosed in the patent to Benjamin, No. 1,298,440, dated March 25, 1919. An auto-stop relay 17 is associated with the tape transmitter and controlled by the contacts of a tape lever 18 resting on the loop of tape feeding into the transmitter, the auto-stop relay 17 being arranged to lock up the stepping magnet of the tape transmitter in the usual manner when the loop of tape from the tape reperforator shortens.

The contacts 15 of the tape transmitter are connected to the conductors 1 to 5, inclusive, of a cable 21 and through the contacts of the connector relays 31, 41 or 51, to the respective channels A, B and C of the multiplex transmitting distributor as described above. The contacts 15 of each tape transmitter are also connected through series resistors 19 to positive battery. The right hand or spacing bus bar of the tape transmitter is grounded and the left hand or marking bus bar is connected through series resistances 20 to negative battery associated with the control element or grid of a vacuum tube 26. Thus it will be seen that whenever one of the contacts 15 of the tape transmitter engages a marking contact, the potential of the grid of the vacuum tube 26 will be changed from negative to positive potential and the tube rendered conducting for a purpose that will be described below. A shunt condenser 27 provides a suitable time delay in the fluctuations of the grid potential so that the tube 26 remains conductive during the stepping of the tape through the tape transmitter although the contacts 15 are momentarily withdrawn from the marking bus bar at each step.

Thus as long as normal code combinations, in which at least one element of the code is marking, are being transmitted through the tape transmitter tube 26 is conductive. However when a blank or all-spacing code combination causes all of the contacts 15 to engage the right hand or spacing contacts, the tube 26 becomes non-conductive by reason of the negative potential applied to the control grid thereof. When one or more of the conductors 1 to 5 of the cable 21 are grounded through the spacing bus bar of the tape transmitter, one or more circuits are closed through a connector relay of the relay chain for operating one or more of the storage relays 61 to 75 respectively associated with the fifteen segments of the segmented sending ring TR of the multiplex transmitting distributor. As shown, one terminal of the winding of each of said storage relays is connected to positive battery whereby the application of ground potential to the other terminal energizes the relay and at a front contact of said relay connects spacing potential to the corresponding segment of the sending ring TR of the distributor. However the resistance of the resistors 20 is of such value that when the contacts 15 of the tape transmitter engage the left hand or marking bus bar, the particular ones of the storage relays 61 to 75 connected at that moment to said contacts are not energized.

After the perforation or storage of a message in the tape associated with the transmitter 15 has been completed, it is necessary to step out enough blank tape from the perforator so that the last message character can reach the contacts of the tape transmitter. This is done by automatically perforating blanks in the tape whenever transmission ceases for a predetermined time sufficient in number to position the last message character beneath the pins of the tape transmitter in the manner shown, for example, in the patent to Hoover et al., No. 1,851,838, dated March 29, 1932. When another message is to be sent over the subchannel, it is desirable to step the blank tape thus formed through the tape transmitter without transmitting said blanks over the line circuit. This is accomplished in the following manner: As soon as the new message is started and the first characters are perforated in the tape, the tape lever 18 drops and closes its contacts which are in circuit with the left hand winding of the auto-stop relay 17. It will be understood that during inoperative periods the auto-stop relay is maintained energized by a locking circuit through its armature and right hand winding and the winding of the stepping magnet 16 of the tape transmitter. Thus the last transmitter stepping pulse received by the stepping magnet 16 of the tape transmitter after the contacts associated with the tape lever 18 opened caused the auto-stop relay 17 to be locked up in series with said magnet which prevents further stepping of the tape transmitter. When the tape lever contacts are again reclosed as described, a circuit is closed from positive battery through the interrupter 28, the third armature and back contact of relay 81, the outer armature and back contact of relay 82, conductor 6 of the cable 21, the right hand outer armatures and back contacts of relays 31, 41 and 51, conductor 7 of the cable 21, the armature and back contact of relay 83, the contacts of the tape lever 18, the left hand winding of relay 17 and the stepping magnet 16 of the tape transmitter to ground. Since the relay 17 is provided with equal differentially-related windings, the closure of said circuit causes the relay to release its armature and open the locking circuit of the stepping magnet 16. Subsequent transmitter stepping impulses flow through the two windings of the relay 17 in opposition, thus intermittently energizing the stepping magnet 16 of the tape transmitter to step the tape through the transmitter without energizing relay 17. In this manner the tape is stepped through the transmitter as long as blanks are positioned over the pins of the transmitter.

However when a normal character is stepped into the transmitter (having at least one marking element in the code combination), at least one of the contacts 15 of the tape transmitter engages the marking bus bar of the transmitter. The application of positive potential to the grid of the vacuum tube 26 through the resistors 19 and 20 changes the potential of said grid from negative to positive and the tube 26 becomes conductive. When said tube becomes conductive, relay 81 having its operating winding connected in series relation with said tube becomes energized and opens at its third armature and back contact the described stepping circuit of the tape transmitter. The stepping of the tape transmitter ceases until the subchannel is cut in to tape its turn with the other operative subchannels, whereupon the tape is stepped through the transmitter under the control of the multiplex distributor in a manner to be described below.

If the contacts associated with the tape lever 18 open because of tight tape before a normal character appears in the transmitter, relay 17 will again be energized by the current traversing its right hand winding to lock up the stepping magnet of the tape transmitter through the armature and the make-before-break contacts of said relay. When the tape loop between the perforator and the tape transmitter again lengthens, the stepping of blank tape through the transmitter will proceed as before.

Upon the energization of relay 81 as described, a circuit is closed from ground through the second armature and front contact of relay 81, the left hand winding of relay 83 and the inner armature and back contact of the relay 82 to battery, whereupon relay 83 becomes energized. The transmitter stepping circuit from the multiplex distributor includes contacts of the chain or connector relays 31, 41 and 51 since this circuit is only operative after the subchannel has been cut in. If the chain relay 51 is operated to connect the first subchannel to channel C of the multiplex system, a circuit is closed by the multiplex local brushes from battery through the C control segment 87 (see Fig. 7), the conductor 88, the outer right hand armature and front contact of relay 51 (Fig. 3), the seventh contact of the cable 21, the armature and front contact and the right hand winding of relay 83 and the right hand winding of relay 82 to ground. Thus the first stepping pulse from the multiplex local segment 87 after cut-in has been effected, energizes relay 82 as it is necessary to divert the first pulse from the stepping magnet of the tape transmitter or the normal character awaiting transmission would be stepped out. Relay 82 is locked up by a circuit extending from battery through its inner armature and front contact, the left hand winding of relay 82 and the middle armature and front contact of relay 90 to ground. Relay 90 is energized when the subchannel is cut in as described below and remains energized as long as the corresponding subchannel is entered on the multiplex system. At the end of the stepping pulse which operated relay 82 in series with a winding of relay 83, relay 83 becomes deenergized since its original operating circuit is interrupted at the inner armature and back contact of relay 82. The deenergization of relay 83 connects the stepping circuit from the multiplex local segment 87 described above through its armature and back contact to the stepping magnet 16 of the tape transmitter so that subsequent stepping impulses operate to step the tape through the transmitter.

When the connector relay 31 of A channel instead of connector relay 51 of C channel is operated, a similar stepping circuit for the first subchannel may be traced from the A control segment 93 of the local ring of the multiplex distributor through the conductor 94, the second armature and back contact of relay 99, conductor 101, the right hand outer armature and front contact of relay 31, the right hand outer armature and back contacts of relays 41 and 51, and conductor 7 of the cable 21 to the armature of relay 83. Similarly when connector relay 41 of B channel is energized, a transmitter stepping circuit for the first subchannel may be traced from the B control segment 95 of the local ring of the distributor, through the conductor 96, the outer armature and back contact of relay 102, conductor 103, the outer right hand armature and front contact of relay 41, the outer right hand armature of relay 51 and conductor 7 of the cable 21 to the stepping magnet of the tape transmitter.

The foregoing description explains how the blanks perforated in the tape are withheld from transmission over the line if they precede the actual connection of the subchannel to the multiplex system. As soon as a normal character is positioned over the pins of the tape transmitter, the automatic stepping of the transmitter stops until the subchannel is cut in whereupon the stepping of the tape transmitter is controlled in timed relation to the operation of the multiplex distributor by control segments 87, 93 and 95 of local ring of said distributor. If further blanks occur in the tape after the subchannel has been cut in, these blanks will be transmitted over the line circuit until the subchannel has been cut out after which further blanks in the tape will be deleted as described above.

At the receiving end of the system the four subchannels are represented by four receiving devices or printers P1, P2, P3 and P4, Fig. 11. These printers may be start-stop telegraph printers connected through individual conductors extending from branch or patrons' offices to the local main office of the system. In order to operate said printers in accordance with the characters received over the multiplex system and stored on the storage relays 271-285 of the receiving bank, stored signals in the form of five-unit code combinations are converted into seven-unit or start-stop signals. The storage relays 271 to 285, inclusive, are arranged to control the transmitting relays 235, 236 and 237 associated with the respective channels of the multiplex system. The line circuit from each printer as shown is connected through the normally closed contacts of the make-before-break contact set of the outer armature of each receiving connector relay, such as the relays 231, 241 and 251 of the first subchannel. The contacts of relay 251 are connected to negative battery to maintain a "rest" potential upon the operating magnet of the printer P1 when the first subchannel is inoperative and the relays 231, 241 and 251 are deenergized. The receiving connector relays of the other subchannels are similarly arranged. When one of the connector relays 231, 241 or 251 is operated, the circuit of the printer P1 is extended through the outer armature of the operated relay, for example relay 231 and the armature of relay 235 to negative battery in order to permit the latter relay to impress the start and selecting pulses on the printer magnet. In a similar manner the relays 241 and 251 when energized connect the printer magnet to the contacts of relays 236 and 237 of the B and C channels of the multiplex system respectively. Similarly the connector relays of the other subchannels are arranged to transfer the circuit of the respective printer magnets to the particular control relay 235, 236 or 237 corresponding to the channel of the multiplex which is to be connected at that moment to a particular printer. The printers P1 to P4 may also be provided with conventional signal and motor control features which are omitted for the sake of simplicity.

*Connector relay chain or mixer*

The connector relay chain or mixer for four subchannels at the transmitting station comprises the connector relays 31 to 34, 41 to 44 and 51 to 54 so arranged as to connect the transmitters of the operative subchannels one after the other to the multiplex channels as described above. The specific relay chain illustrated is similar to that disclosed and claimed in the above-mentioned patent to Pierson and Adams. While only four subchannels are shown, the operating circuits for the respective groups of four connector relays for each multiplex channel are arranged in series relation and it will be obvious that as many more subchannels may be similarly connected as desired. Likewise in a multiplex system employing more or less than three channels, other vertical sets of connector relays may be added in a manner that will be obvious from the following description to provide for connecting a series of operative subchannels to any desired number of multiplex channels in order.

If the number of operative subchannels is not greater than the number of multiplex channels available, three in this instance, the relay chain does not step during the cyclic operation of the multiplex distributor. In the following description of the relay chain this special case will be considered first.

The operation of cutting in the first subchannel results in the energization of relay 90 in a manner to be described below. Upon the energization of relay 90, a circuit is closed from ground through the outer right hand armature and front contact of relay 90, the winding of relay 105, conductor 104 and the third right hand armature and back contact of relay 106 to battery, whereupon relay 105 becomes energized. Each of the other subchannels is similarly provided with a chain control relay 107, 108 and 109, corresponding to the relay 90, and said relays are likewise operated when the corresponding subchannel is cut in and released when the subchannel is cut out. The energization of any of the relays 107, 108 and 109 also effects the energization of relay 105, which thus remains energized as long as any subchannel is cut in.

Assuming that the third subchannel has been cut in, upon the energization of relays 108 and 105, when the brushes B3 of the multiplex transmitting distributor connect battery to the local segments 111 or 112 of the right hand local rings, a circuit is closed from said battery through the conductor 113, the armature and front contact of relay 105, conductor 114, the inner left hand armature and back contact of guard relay 122, conductor 115, the inner right hand armature and back contact of relay 109, the inner right hand armature and front contact of relay 108, conductor 116, the right hand operating winding of relay 53, the winding of guard relay 123 and resistor 119 to negative battery, whereupon relays 53 and 123 become deenergized. Relay 53 locks up through a circuit extending from negative battery through the winding of relay 123 and the locking winding of relay 53, inner left hand armature and front contact of relay 53 and the rectifier 133 to ground thus maintaining the relays 53 and 123 energized after the end of the operating pulse from the multiplex distributor.

Each time the brushes of the multiplex transmitting distributor make another revolution, the described circuit of relays 53 and 123 is reclosed and the third subchannel remains connected to C channel of the multiplex system. If either of the other subchannels had become operative instead of the third subchannel, this subchannel would likewise have been connected through connector relays 51, 52 or 54 to C channel of the multiplex system. The operating circuit of the fourth connector relay 54 for example, may be traced as follows: from the local segments 111 and 112 of the right hand local ring of the distributor through the conductor 113, the armature and front contact of relay 105, conductor 114, the inner left hand armature and back contact of relay 122, conductor 115, the inner right hand armature and front contact of relay 109, conductor 117, the right hand operating winding of relay 54 and the winding of relay 123 to negative battery. In a similar manner the operating chain pulse from the C channel local segments of the distributor is diverted through the contacts of the operated chain control relay 90 or 107 to the connector relays 51 or 52 when the first or second subchannel is operative. It will be noted that when a subchannel is first connected to the multiplex system it will be connected through one of the connector relays 51 to 54 of the C channel group since the connection diagram shown is arranged to send the first character from an operative subchannel over the C channel of the multiplex system. This and various other detailed features of the wiring shown are merely a matter of choice and are not essential.

When a connected subchannel for instance the third subchannel is to be cut out, the corresponding chain control relay such as relay 108 becomes deenergized and causes relay 105 to become deenergized. The next succeeding chain impulse from the local segments 111 and 112 of the distributor is connected through the conductor 113, the armature and back contact of relay 105 and the conductor 118 to the upper end of the resistor 119 in the locking circuit of relays 53 and 123. Thereupon the current in the winding of relay 123 and the locking winding of relay 153 drops to zero and said relays are deenergized, the rectifier 133 preventing reversed flow of current from the locking ground to positive battery at the local ring of the multiplex distributor. The other connector relays in case one of the other subchannels is to be cut out are unlocked in a similar manner upon the deenergization of the chain control relay 90, 107 or 109 and relay 105.

If three subchannels are cut in simultaneously, these subchannels will be connected to separate channels of the multiplex system. Thus if the multiplex distributor rotate, this relationship of the first three subchannels to the multiplex system is not disturbed and the three subchannels remain connected to channels B, A and C, respectively of said system. It will be noted that each of the three chain relays of a particular subchannel is provided with contacts which short-circuit the operating windings of the other two relays of said group. By reason of this arrangement and the other connections shown it is insured that during the operation of the mixer or relay chain shown there will never be more than one relay operated in any vertical row or in any horizontal row. Thus there can never be more than one subchannel connected to a channel of the multiplex system or a subchannel connected to more than one channel of said system.

When any multiplex channel is idle, the letter "X" (#2 spacing code combination) is sent continually over said channel. The sending relays 61 to 75, inclusive, are disconnected from all transmitters when the multiplex channels are idle. However when channel A for example, is not connected to any subchannel transmitter, connector relays 31 to 34 and the guard relay 121 are deenergized. A circuit is closed, therefore, from ground through the right hand armature and back contact of relay 121, the conductor 141, the second conductor of the cable 60, the fourth right hand armature and back contact of relay 142, Fig. 6, conductor 143 and the winding of sending relay 62, whereupon the latter becomes energized to apply spacing potential to the second segment of the transmitting ring of the multiplex distributor so that the letter "X" is transmitted on A channel as long as the channel remains idle. Similarly if no subchannel is connected to the second multiplex channel respective connector relays are in shunt relation to the operating circuits of the other relays in each vertical group. Therefore, since the respective connector relays are locked up to ground potential at the rectifiers 131, 132, 133 and 134, the application of a positive operating pulse from the chain control segments 111, 112, 125 or 135 of the multiplex local ring at the right hand or negative potential end of the locking winding of any particular connector relay reduces the current to zero in the locking winding of said relay. Thus any connector relay which is locked up to connect one subchannel to the multiplex system is released whenever another connector relay of the same vertical group is operated to connect another subchannel to the same multiplex channel.

If we assume that the first subchannel is connected to channel B of the multiplex through connector relay 41, the second subchannel is connected to channel A of the multiplex through connector relay 32 and the third subchannel is connected to channel C of the multiplex through connector relay 53 in the manner described above, and the fourth subchannel is cut in by the energization of relay 109, this subchannel will take its turn with the other three subchannels in transmitting over the multiplex system. When the C chain pulse is applied to the conductor 113 from the local ring of the distributor under the assumed conditions current will flow from positive battery through said conductor, the armature and front contact of relay 105, conductor 114, outer left hand armature and front contact of relay 41, conductor 146, conductor 147, the outer left hand armature and front contact of relay 123, conductor 115, the inner right hand armature and front contact of relay 109, conductor 117, the right hand operating winding of relay 54 and the winding of relay 123 to negative battery, whereupon relay 54 becomes energized and locks up through the above described locking circuit including the rectifier 134 and relay 123 is maintained energized. As stated above, however, the positive operating pulse for the chain relay 54 causes the chain relay 53 which had been previously locked up to be released since the locking circuit through the left hand winding of relay 53, the left hand inner armature and front contact of said relay and the rectifier 133 is in shunt relation to the operating circuit of relay 54 and the rectifier 133 prevents the current in the locking winding of relay 53 from reversing. It should be noted that if the rectifier 133 were not provided, at the instant when relay 54 operated and before relay 53 has had time to release, the locking winding of relay 54 would form a path for an inductive surge of current resulting from the decreasing current in the locking coil of relay 53. This inductive surge would tend to reduce the rate of fall of magnetism in magnetic circuit of relay 53 and said relay might not release in the interval of time during which the local brush B3 is on the segment 111 or 112. However the rectifier 133 suppresses this surge of current and the relay releases its armatures practically instantaneously. It will be apparent that the operating and locking circuits of the respective connector relays in each vertical row are similarly arranged so that the operation of any chain relay unlocks any previously operated chain relay in the same vertical row.

The operation of relay 54 and release of relay 53 disconnects subchannel 3 from channel C of the multiplex and connects the fourth subchannel to said multiplex channel. When the brushes B3 of the distributor engage the A chain segment 125, the chain pulse through conductor 126 operates chain relay 33 and releases the locked up chain relay 32, whereby the third subchannel is connected to channel A of the multiplex in place of the second subchannel. Similarly the B chain pulse from the distributor operates chain relay 42 and releases chain relay 41 to connect the second subchannel to channel B of the multiplex in place of the first subchannel and so on, whereby each subchannel will be connected in order to the multiplex channels in a manner dependent upon the number of operating subchannels.

The connector relays at the receiving station and the control circuits therefor from the local ring of the multiplex receiving distributor are arranged in identically the same manner and under the control of a series of chain control relays corresponding to relays 90, 107, etc., of Fig. 1. These control relays are indicated diagrammatically in Fig. 11. The connector relays of the receiving relay chain are thus operated in the same order as the chain relays at the transmitting station to connect the printers P1 to P4 to the respective multiplex channels to record on each individual printer the intelligence signals which are sent by the corresponding transmitter at the transmitting station.

*Subchannel cut-in control*

The cut-in or cut-out of a subchannel is effected automatically under the control of the autostop contacts controlled by the tape lever 18 of each subchannel whenever transmission is to be started or has been completed, respectively. As pointed out above, closure of said contacts upon the lengthening of the tape loop to the tape transmitter and the positioning of a normal character over the pins of the transmitter cause relay 81 to be energized. Relay 81 becomes deenergized again when the characters perforated in the tape have been transmitted and the tape lever 18 is raised to open the associated contacts. The energization of relay 81 when the chain control relay 90 is deenergized closes a common test circuit which starts the control switches at the sending and receiving ends hunting for the group of subchannels in which the change in the subchannel pattern is to be made. The common test circuit is likewise closed at the end of transmission to effect a similar result when relay 81 becomes deenergized and relay 90 is energized. The pattern switch at the transmitting station comprises a rotary step-by-step switch having a stepping magnet 160 and six wipers 161 to 166 each adapted to engage a series of bank contacts. The control switch at the receiving station which is stepped in synchronism with the pattern switch comprises a stepping magnet 260 and movable wipers 261 to 266 operated thereby. In addition a step-by-step control switch is provided at the transmitting station comprising an operating magnet 170 and wipers 171 to 176 controlled thereby.

Assuming that the first subchannel has been idle and relay 81 becomes energized, as described above, in response to the lengthening of the tape loop at the transmitter of said subchannel, the test circuit which initiates the operation of the pattern and control switches may be traced from ground through the outer left hand armature and back contact of relay 90, the outer left hand armature and front contact of relay 81, conductor 150, resistor 151, the left hand armature and back contact of relay 106, conductor 152, wiper 175 of the control switch in its home position to the grid of the vacuum tube 154 which is in series relation with a relay 155. When ground potential is applied to the grid of said tube the tube conducts current and causes relay 155 to become energized. The grid of the vacuum tube 154 is connected to negative battery through the series resistors 156 and 157, and is controlled by the negative charge on the condenser 158 whereby the tube is normally non-conducting. The charge on the condenser 158 may leak off through the shunt resistor 156 after a predetermined period of time to permit the tube to become conducting but under ordinary conditions the tube is rendered conducting by the closure of the common test circuit. However even if no subchannel seeks to cut in or out for a long period, the relay 155 is operated periodically, for a purpose that will be explained, by the timed operation of the tube 154.

Upon the energization of relay 155, the associated signal lamp 159 is lighted to indicate that the pattern signal has been initiated and a circuit is closed from ground through the armature and front contact of said relay, the wiper 176 of the control switch, conductor 177, left hand outer armature and back contact of relay 178, the right hand outer armature and back contact of relay 179, conductor 180, resistor 181, left hand or operating coil of relay 102, the third armature and back contact of relay 99, conductor 182, wiper 171 of the control switch and conductor 183 to the local segment 184 of the left hand local ring of the transmitting distributor. As soon as the multiplex brushes B2 engage the local segment 184 the above described circuit is connected to positive battery at the local ring of the distributor, and relay 102 becomes energized and locks up through its right hand locking winding and its inner armature and front contact. It will be noted that by reason of the position of the local segment 184 on the distributor, relay 102 becomes energized shortly after transmission of a character on B channel of the multiplex system.

When the brushes B2 of the distributor engage local segment 95, a circuit is closed from positive battery through said segment, the conductor 96, the outer armature and front contact of relay 102 and the left hand operating winding of relay 185 to ground whereupon relay 185 becomes energized and locks up through its locking winding and its inner armature and front contact. The operation of relay 185 sets up a blank on B channel of the multiplex since the outer back contacts of storage relays 66 to 70 which normally impress marking potential on segments 6 to 10 of the transmitting ring are connected through the conductor 187 and the middle armature and front contact of relay 185 to spacing battery so that even if one or more of said relays is in the marking or deenergized position, spacing battery is connected to the segments of the transmitting ring. Therefore upon the next revolution of the brushes of the transmitting distributor, a blank or all-spacing code combination is sent to initiate the operation of the pattern switch at the receiving office. Spacing battery potential is normally connected to the front contacts of the outer armatures of relays 66 to 70 of B channel through the conductor 188. When relay 185 is deenergized, marking battery is connected through the middle armature and back contact of said relay and the conductor 187 to the back or marking contacts of said storage relays of the B channel.

It will be noted that the operation of relay 102 as described, diverted the B channel transmitter stepping pulse from segment 95 of the local ring to the winding of relay 185 and thus prevented the stepping of the transmitter which would normally have operated over the B channel. This withholds the transmission of the character set up on this subchannel so that the blank can be sent on B channel by the operation of relay 185 as described without losing the character which would normally be sent from a subchannel over said multiplex channel since this character will be withheld for transmission at the next opportunity presented to the subchannel.

During the next revolution of the brushes of the multiplex distributor, a circuit is closed through the local segment 189, conductor 190, the first conductor of the cable 191, wiper 161 of the sending pattern switch in its home position, conductor 192 and the second left hand armature and back contact of relay 142 to the negative terminal of the locking winding of relay 102 whereupon relay 102 becomes deenergized. A circuit is then closed through local segment 195 of the transmitting distributor, the conductor 196, the wiper 172 of the sending control switch in its home position, conductor 197, the armature and front contact of relay 185 and the right hand operating winding of relay 99 to negative battery whereupon relay 99 becomes energized. At the end of the described operating pulse for relay 99, said relay becomes locked up through its inner armature and front contact, its left hand locking winding and the winding of relay 142 whereupon relay 142 also becomes energized. The operation of relay 142 connects the circuits of the sending relays 62, 63, 64 and 65 of the A multiplex channel through the first four right hand armatures of said relay and the cable 191 to the wipers 163, 164, 165 and 166 of the sending pattern switch. When the switch is at its home position as shown, a guard character is set up on the A channel upon the operation of relay 142 and this guard character is transmitted in the next revolution of the distributor brushes following the first blank on B channel.

It will be noted that the operation of relay 99 opens at its second armature and back contact the transmitter stepping circuit for the subchannel transmitter that is connected to the A multiplex channel, when the guard signal is to be sent over this channel, so that the character which would normally be sent over the A channel will be deferred until the subchannel transmitter is again connected to the multiplex system. This operating circuit for the transmitter includes conductor 94 and local segment 93 of the distributor. It will be apparent that each time a control signal is transmitted over A multiplex channel, the subchannel transmitter stepping circuit is opened in a similar manner to defer subchannel transmission during the transmission of the control signal.

As indicated the guard character in this particular instance consists of the code combination having the third and fifth elements spacing, since the storage relays 63 and 65 will be energized by the ground potential on the first contacts associated with the wipers 164 and 166 of the pattern switch. In accordance with one feature of the invention, a different guard character is employed in each varioplex system where more than one system terminates in a single office. At the receiving station the reception of the guard character is checked and if the wrong code combination is received the operation of the system is stopped automatically. This prevents the varioplex control apparatus from being accidentally connected to the wrong multiplex system when starting up after the system has been shut down.

After the blank is sent on B channel a circuit is closed from battery through the local segment 184 of the transmitting distributor, the conductor 183, wiper 171 of the sending control switch at its home position, conductor 182, second armature and front contact of relay 99, conductor 201, the winding of the switch magnet 170 and the conductor 202 to negative battery whereupon the switch magnet 170 becomes energized and attracts its armature. At the end of the operating pulse the magnet armature is released and actuates the wipers 171 to 176 into engagement with their second bank contacts. At the same time a circuit is closed through the local segment 198 of the second local ring of the distributor and the conductor 199 to the negative terminal of the locking winding of relay 185 whereupon this relay becomes deenergized. Since relay 102 is now deenergized the next transmitter stepping pulse from the B local segment 95 will not reenergize relay 185 but will be impressed upon the subchannel transmitter connected to the B multiplex channel and characters will be transmitted from subchannel transmitters over the B channel in the regular manner. On the following revolution of the brushes of the multiplex distributor the guard character will be sent on A channel as described and either a blank or normal character on B channel.

During this revolution of the distributor brushes an operating impulse will be transmitted from a local segment 189 of the distributor through the conductor 190, the first conductor of the cable 191, the wiper 161 of the sending pattern switch in its home position, conductor 192, the second left hand armature and front contact of relay 142, conductor 203, the winding of the switch magnet 160 of the pattern switch and conductor 204 to negative battery to energize the operating magnet of the pattern switch. At the end of the operating pulse the switch wipers 161 to 166 will be stepped by the release of the switch armature in the usual manner. The sending control and pattern switches continue to step during the successive revolutions of the multiplex distributor until the control switch reaches the group of four subchannels containing the subchannel which is to be cut in or out, subchannel 1 in this instance.

When the switch wipers of the control switch are in engagement with their second bank contacts, the circuit for operating the switch magnet 170 may be traced from the local segment 184 through the conductor 183, the wiper 171 and the second bank contact engaged by said wiper directly to the upper terminal of the winding of the magnet 170 so that the control switch wipers step into engagement with their third bank contacts after the local brushes B2 apply battery to the segment 184. When the wiper 171 engages its third bank contact the operating circuit of the magnet 170 may be traced from the same local segment 184 through the wiper 171, the conductor 205, the outer armature and back contact of relay 99 and conductor 201 to the switch magnet 170 thereby stepping the switch wipers 171 to 176 into engagement with their fourth bank contacts. At this point the operating circuit of the switch magnet includes the local segment 184, wiper 171, the conductor 206, the fourth armature and back contact of relay 99 and the conductor 201. However, when the switch wipers 171 to 176 engage their fourth bank contacts a group test is made for the pattern change and since it is assumed that the first subchannel is to be cut in at this time, the pattern is sent in a manner to be described.

The pattern switch is likewise operated until the wipers 161 to 166 engage their fourth bank contacts at the time the pattern signal is transmitted. The operating circuit for the switch magnet 160 of the pattern switch may be traced from the local segment 189 through the conductor 190, first conductor of the cable 191, wiper 161 of the pattern switch which has been stepped into engagement with its second bank contact as described above, the winding of the magnet 160 and the conductor 204 to negative battery. Since the second and third bank contacts associated with the wiper 161 are connected together, an operating circuit similar to that just described is closed upon the following revolutions of the distributor brushes for stepping the switch wipers 161 to 166 into engagement with their fourth bank contacts.

If none of the subchannels in the group shown had changed from the inoperative to the operative condition or vice versa, the sending pattern and control switches would continue to step until they reached the group of subchannels where a change in the pattern had occurred. However, since it is assumed that the first subchannel is to be cut in as stated above, when the wipers of the control switch engage their fourth bank contacts, a group test circuit is closed which initiates the transmission of the pattern and confirmation signals and operates relay 90 to cut in the transmitting end of the first subchannel. The group test circuit may be traced from ground through the outer left hand armature and back contact of relay 90, the outer armature and front contact of relay 81, conductor 150, conductor 208, the fourth bank contact of the control switch engaged by the switch wiper 175, conductor 152, left hand armature and back contact of relay 106, conductor 209, the fourth bank contact and switch wiper 176 in engagement therewith, the conductor 177, the outer left hand armature and back contact of relay 178, the outer right hand armature and back contact of relay 179, conductor 180, resistor 181, left hand operating winding of relay 102, the left hand outer armature and back contact of relay 142, the outer armature and back contact of relay 194, conductor 217, the fourth bank contact and switch wiper 172 in engagement therewith, conductor 196 and the local segment 195 of the left hand local ring of the multiplex distributor, whereupon relay 102 becomes energized and locks up through its inner armature and front contact, and locking winding, as before. The energization of relay 102 subsequently operates relay 185 to transmit a second blank on B channel immediately following the confirmation signal as described above in connection with the common test and transmission of the first blank on B channel.

Before the transmission of the second blank on B channel however, a switch stepping circuit from the local segment 184 through conductor 183, switch wiper 171 and fourth bank contact, conductor 206, the fourth armature and back contact of relay 99 and conductor 201 is closed to step the switch wipers 171 to 176 of the control switch into engagement with their fifth bank contacts. Then a circuit is also closed from the local segment 189 for operating the pattern switch. This may be traced through the conductor 190, first conductor of the cable 191, switch wiper 161 and fourth bank contact, conductor 210, middle armature and back contact of relay 194, conductor 203, and operating switch magnet 160 of the switch, thereby stepping the switch wipers 161 to 166 into engagement with their fifth bank contacts. During the transmission of the blank on B channel as described above, a circuit is closed through a local segment 195, the conductor 196, switch wiper 172 and its fifth bank contact, conductor 197, outer armature and front contact of relay 185 and the right hand operating winding of relay 99 to negative battery whereupon relay 99 becomes energized and locks up in series with relay 142 as described above at the end of said operating pulse. The energization of relay 142 transfers the circuits of the storage relays 62 to 65 of A multiplex channel to the pattern switch as described above in connection with the transmission of the guard character.

When the local brushes B2 of the distributor engage local segment 184, a circuit is closed from said segment through conductor 183, wiper 171 in engagement with its fifth contact, conductor 205, the outer armature and front contact of relay 99, conductor 211, winding of relay 212 and the switch magnet 170 to negative battery whereupon relay 212 becomes energized and the armature of the switch magnet 170 is attracted. While relay 212 remains energized, a circuit is closed from positive battery through its outer armature and front contact, conductor 213, left hand armature and back contact of relay 179, the middle left hand armature and back contact of relay 178, conductor 177, switch wiper 176 and its fifth bank contact, conductor 215, the armature and back contact of relay 91 and the right hand windings of relays 81 and 90 to ground, thus holding relay 81 energized and operating relay 90 to cut in the first subchannel. As pointed out above, when relay 90 is operated, the control circuits for the relay chain are altered to include the first subchannel in the cycle operation of the relay chain to connect the subchannel to the multiplex system. At the end of the operating pulse through the winding of relay 212 and the switch magnet 170, relay 212 becomes deenergized and the wipers 171 to 176 of the control switch are stepped into engagement with their sixth bank contacts. If the first subchannel had previously been cut in and relay 90 had been operated, the deenergization of relay 81 when transmission was completed from the subchannel closes a circuit from ground through the inner armature and back contact of relay 81 and the left hand winding of relay 91, so that relays 90 and 91 are operated and relay 81 released before the subchannel has been cut out. In that case the above described operating impulse through conductor 215 from the armature of relay 212 would have been diverted through the armature and front contact and right hand winding of relay 91 to the locking contact of relay 90 to knock down relay 90. The release of relay 90 is effected in an obvious manner since the described operating impulse is from positive battery at the armature of relay 212 and the locking winding of relay 99 is connected through its inner armature and front contact to negative battery at the armature of relay 110. The release of chain control relay 90 in this manner effects the cutting out of the subchannel as explained above.

The energization of relay 90 in response to the operation of relay 212 as described, opens a circuit from ground through the outer right hand armature and back contact of relay 90 and the conductor 216 to the fifth and sixth bank contacts of the pattern switch associated with the wiper 166. Similar circuits may be traced from the outer right hand armatures of the chain control relays 107, 108, 109 of the second, third and fourth subchannels to the fifth and sixth contacts associated with the wipers 165, 164 and 163, respectively, so that the potentials upon these respective bank contacts correspond to the operative or inoperative condition of the subchannels. With the wipers of the pattern switch engaging the fifth bank contacts and relay 142 energized as described, the pattern set up on the fifth contacts control the storage relays 62, 63, 64 and 65, so that the pattern signals sent on the A multiplex channel comprises a spacing pulse for each subchannel which is to be cut out and a marking pulse for every subchannel that is to be cut in; thus the second, third, fourth and fifth elements of the code combination sent over the A channel form a pattern signal representing the desired operative or inoperative condition of the four subchannels in the first group. At the receiving end this pattern is arranged to operate the chain control relays of the receiving relay chain for the subchannels which are cut in at this transmitting end and thereby cut in the receiving ends of said subchannels simultaneously, and to release the chain control relays for the subchannels which are to be cut out.

After transmission of the pattern signal on the A channel, a circuit is closed through local segment 189, the conductor 190, the first conductor of the cable 191, wiper 161 of the pattern switch, and the fifth bank contact for energizing the switch magnet 160 of the pattern switch, whereupon the wipers 161 to 166 are stepped into engagement with their sixth bank contacts. A circuit is then closed through the local segment 195 of the transmitting distributor, conductor 196, wiper 172 of the control switch in engagement with its sixth bank contacts, conductor 217, the outer armature and back contact of relay 194, the left hand outer armature and front contact of relay 142 and the right hand winding of relay 102 to negative battery, whereupon relay 102 becomes energized. The energization of relay 102 causes relay 185 to be energized as described above to transmit a second blank on B channel during the next revolution of the multiplex distributor brushes and immediately following the confirmation signal which is sent on A channel in a manner to be described below. This second blank causes operations to take place at the receiving station which stop the system in the event of the failure of the preceding blank, as will be described hereinafter. Before this blank is transmitted a circuit is closed through local segment 184, conductor 183, wiper 171 of the control switch in engagement with its sixth bank contacts, conductor 206, the fourth armature and front contact of relay 99 and the left hand winding of relay 194 to ground whereupon relay 194 becomes energized and locks up through its right hand locking winding and inner armature and front contact.

On the next revolution of the brushes a confirmation signal is transmitted on the A multiplex channel as a check on the operation of the subchannel control apparatus and of the correct transmission of the control signals. This confirmation signal will normally have its first pulse spacing, the control of the pulse being determined by the relay 351, the circuits of which will be described below. The second, third, fourth and fifth pulses will be transmitted with their polarities reversed with respect to those of the previously transmitted pattern signal. Relays 62 to 65 have their front contacts connected to the inner armature of relay 77 and their back contacts to the outer armature of relay 77. When the pattern signal is transmitted relay 77 is in its released position and marking and spacing battery are therefore applied to the back and front contacts respectively of relays 62 to 65. The potentials on the front and back contacts of relays 62 to 65 are reversed by the operation of relay 77 when a confirmation is transmitted. The operation of relay 77 at this time is caused by a circuit from negative battery at pattern switch wiper 162 in engagement with its sixth bank contact, conductor 78, the winding of relay 77, conductor 79, front contact and fifth right hand armature of relay 142 to ground. The confirmation signal transmitted following each pattern signal is utilized at the receiving station to check the position of the chain control relays which have been operated or released by the pattern signal. A failure of the pattern signal received, position of the receiving chain control relay, and confirmation signal received, to bear certain predetermined relations to each other will cause the entire system to be stopped as will be described below.

As the confirmation signal is transmitted the brushes of the multiplex distributor close a circuit through the local segment 189, conductor 190, first conductor of the cable 191, wiper 161 of the pattern switch in engagement with its sixth bank contacts, conductor 210 and the middle armature and front contact of relay 194 to the negative terminal of the locking winding of relay 102, whereupon said latter relay becomes deenergized. Both the control and pattern switches remain stationary for a complete revolution of the multiplex brushes since the normal stepping pulse for the right hand control switch was diverted to the winding of relay 194 as described and the stepping pulse for the pattern switch through the middle armature of relay 194 is open at the back contact thereof.

A circuit is then closed through the segment 195, conductor 196, the switch wiper 172 in engagement with its sixth contacts, conductor 217, the outer armature and front contact of relay 194 and the winding of relay 193 to the negative terminal of the locking windings of relays 99 and 142 whereupon relay 193 becomes energized and relays 99 and 142 are deenergized. A circuit is then closed from the local segment 184 through conductor 183, the switch wiper 171 in engagement with its sixth bank contacts, conductor 206, the fourth armature and back contact of relay 99, conductor 201, the winding of switch magnet 170 and conductor 202 to the negative terminal of the locking winding of relay 194, whereupon relay 194 is knocked down and the control switch is stepped to the seventh position. The wipers of the sending control switches continue to step as described above and the other groups of subchannels are tested in the same manner as described in connection with the first four subchannels. The test pulse which was described above as originating at local segment 195 originates in each instance either at said segment or at the contacts of relay 193, depending upon whether or not the previous group of subchannels has sent a pattern signal. Relay 193 is pulsed at the same time that the local brush B2 passes over local segment 195 and connects battery to one terminal of the left hand winding of the test relay 102 so that this relay becomes energized if the test circuit is closed in the same manner as described above in connection with the operation of relay 102 from the local segment 195. As shown on the drawing, the fifth and sixth bank contacts associated with the wipers 163, 164, 165 and 166 are connected to contacts of the chain control relays 90, 107, 108 and 109 to set up a pattern signal on A channel in accordance with the operative or inoperative condition of these subchannels. In a similar manner contacts 7 and 8 associated with said switch wipers are connected to contacts of the chain control relays of the second group of subchannels (not shown). In a similar manner additional subchannels may be arranged to send pattern and confirmation signals by providing additional bank contacts on the control switches.

The control switches continue stepping as the brushes of the multiplex distributor revolve, the operating circuits for the switch magnets being described above. When the wipers of the two switches have been stepped to their home positions illustrated in the drawings, the stepping circuits are interrupted and the wipers remain stationary until another subchannel is to be cut in or cut out or the control switches are started by other conditions, such as the appearance of a blank on B channel which is set up by a subchannel transmitter which happens to be connected to B channel at that moment.

When the switch wiper 162 engages its last bank contact, a circuit is closed through said wiper from negative battery to the grid of the vacuum tube 154 and the ungrounded terminal of the condenser 158. The condenser 158 is charged, and the negative potential on the grid of the tube interrupts the operating current for relay 155 and said relay becomes deenergized. The charge on the condenser 158 gradually leaks off through the resistor 156. By suitable proportioning of the capacity of the condenser 158 and resistance of the resistor 156, the circuit may be designed to render the vacuum tube again conducting after any desired time internal, for example fifteen seconds. If the common test circuit has not been reclosed during this interval, the flow of current through the vacuum tube 154 causes relay 155 to be energized and to initiate the operation of the control switches to send the guard character which is sent each time the control switches operate. This arrangement provides for the transmission of the guard character and stepping of the control switches at intervals of not less than fifteen seconds or any other desired interval even though none of the subchannels has become active or inactive and closed the common test circuit during this interval. The failure to receive the guard character periodically at the receiving station is taken as an indication of the failure of the circuit or apparatus and causes the entire system to be stopped.

The stepping of the control switches may also be initiated as mentioned above when a blank is set up on B channel from a subchannel transmitter. This is necessary because the reception of a blank on B multiplex channel on the receiving end would initiate the operation of the receiving control switch since a blank on B channel precedes the group of switching and control signals which are sent when subchannels are to be connected or disconnected. Assuming that a blank or all-spacing signal has been set up on B multiplex channel and relays 66, 67, 68, 69 and 70 are energized, a circuit is closed through the local segment 195, conductor 196, wiper 172 in engagement with its first bank contact, conductor 197, the outer armature and back contact of relay 185, conductor 218, the inner armatures and front contacts of relays 70, 69, 68, 67 and 66, conductor 219 and the right hand winding of relay 99 to negative battery, whereupon relay 99 becomes energized, operates the associated relay 142 and initiates the stepping of the control switches and the sending of the guard character over the A multiplex channel in the manner described above. If no subchannels are to be cut in or out, the sending control switches simply step back home and no pattern signals are transmitted. However, since a group test circuit may be closed at this time (after the blank on B multiplex channel had initiated the stepping of the receiving control switch) it is necessary to step the sending and receiving control switches in synchronism in order that any pattern signal from the transmitting station may be employed to control the proper group of receiving subchannels. The arrangement of circuits is such that when a blank is transmitted on the B channel, during the stepping of the switches, if that blank is transmitted at a time when a group test might have caused the transmission of a blank, a pattern and confirmation signal will be transmitted in the usual manner. The circuit which accomplishes this is similar to that which causes the guard character to be sent when a blank appears on the B channel with the switches on their home contacts.

At the receiving end of the system the receipt of the pattern signals with their accompanying control signals (blanks, etc.) normally cut in or out the printers corresponding to the transmitters which are simultaneously being cut in or out at the transmitting station. The line signals operate the receiving relay 270, Fig. 8, and are repeated by the contacts of said relay through the brushes B4 of the multiplex receiving distributor and the segments of the receiving ring RR to the windings of the polar receiving relays 271 to 285, respectively. The relays 271 to 285 are of the banking type, as shown, in which the armatures remain in engagement with either the marking or spacing contacts after each operating pulse until a pulse of reverse polarity is impressed on the relay winding. Other conventional receiving apparatus such as vacuum tube relays or locking neutral relays may be utilized in place of the polar banking relays, if desired. As shown, the right hand contacts of the A channel relays 271 to 275 are intended to represent the marking contacts whereas the left hand contacts of the B channel relays 276 to 280 are marking contacts of these relays. The operation of the receiving relays 281 to 285 of C channel is similar to those of A channel, the armatures of said relays being moved to the right on marking signals.

As pointed out above, the operation of the transmitting relays 235, 236 and 237 of the respective multiplex channels is controlled jointly by the positions of the polar receiving relays and by the segmented local ring engaged by the distributor brushes B5 in order to convert the code combinations set up on the contacts in the receiving relays into seven unit or start-stop code signals. The arrangement shown, in which a segmented local ring is employed to secure the proper timing of the operation of the transmitting relays 235, 236 and 237, has the advantage that the use of separate start-stop distributors for each multiplex channel or each subchannel is avoided. Thus with the arrangement shown the armatures of the transmitting relays may be connected directly to start-stop printers or receiving devices.

The operation of the receiving connector relay chain comprising relays 231 to 234, 241 to 244, and 251 to 254, as pointed out above, is the same as that of the connector relay chain at the transmitting station. The relays 290, 291, 292 and 293 correspond to the chain control relays 90, 107, 108 and 109 at the transmitting station. Therefore when any one of these relays at the receiving station is energized, the receiving end of the corresponding subchannel is cut in to take its regular turn with the other subchannels and when the relay is deenergized, the subchannel is cut out. Since it has been assumed that the first subchannel is to be cut in and the pattern signal for cutting in this subchannel has been transmitted, it is evident that relay 290 is deenergized but will be energized upon receipt of the pattern signal.

The receiving control switch comprising the operating magnet 260 and the movable switch wipers 261 to 266 is shown at its home position where the switch wipers remain during normal transmission or until a switching signal is received. Relay 295 has previously been energized in a manner that will be described and is locked up through a circuit from positive battery through the right hand armature front contact and locking winding of relay 295, the outer right hand armature and back contact of relay 296 and wiper 261 of the control switch to ground.

When the first blank is received on B channel, which always precedes the guard and pattern signals, the receiving relays 276 to 280, respectively, of B channel will all be operated to spacing and their armatures will be in engagement with their right hand contacts. Upon the next revolution of the brushes of the receiving distributor, a circuit will be closed from positive battery through local segment 301, the local brushes B6, the conductor 302, wiper 262 of the control switch in engagement with its first bank contact, conductor 303, the right hand armatures and right hand contacts of relays 280, 279, 278, 277 and 276, conductor 304 and the winding of relay 296 to ground, whereupon relay 296 becomes energized and locks up through the locking winding and the right hand inner armature and front contact of said relay to negative battery. The energization of relay 296 interrupts the described locking circuit of relay 295 and this relay becomes deenergized.

When the local brushes B6 of the distributor engage segment 306, a circuit is closed through said segment, the conductor 307, the left hand inner armature and front contact of relay 296, the winding of relay 308, the left hand outer armature and back contact of relay 295 and the left hand winding of relay 309 to negative battery for energizing relays 308 and 309. The energization of relay 308 momentarily connects the contacts of the receiving relays 272—275 through contacts 2 to 5 of the cable 311 to the control switch before the wipers 261—266 are stepped from the home position in order to check the reception of the guard character. At the end of the operating pulse for relays 308 and 309, relay 308 becomes deenergized. Relay 309 controls the switch magnet 260 and locks up in series with its right hand armature and front contact and the contacts 310 controlled by the magnet armature. Thus relay 309 remains energized until the operating pulse has ceased and until the armature of the switch magnet has been completely operated and opened the contacts 310. Relay 309 then becomes deenergized and the retractive spring on the magnet armature steps the switch wipers 261—266 into engagement with their second bank contacts.

As it has been assumed that the guard character consists of the code combination having the third and fifth elements spacing, the receiving relays 273 and 275 of A channel will have their armatures operated to the left if the guard character is received properly and relays 272 and 274 of A channel will be operated marking. The guard character reserved for this particular system is read at the receiving station at this time in order that the system may be stopped if the proper code combination does not follow the initial blank on B channel. Obviously various conditions may cause the wrong code combination to follow the initial blank combination, such as the accidental connection of another varioplex system at the transmitting office which would result in the transmission of a different guard character; a distortion of the regular guard character in transmission; the failure to send a guard character following this particular blank combination on B channel; a line failure of such a character as to cause the signals transmitted from the second station (Figs. 8 to 11) to be received by the receiving equipment shown at said station which would impress the guard character intended for use in the transmission in the opposite direction upon its receiving apparatus.

If the proper guard character is not received, a circuit is closed from ground through the left hand armature and back contact of relay 378, the left hand winding of the "pattern failure" relay 379 and one of the levels of the receiving control switch to battery at one of the contacts of the receiving relays for operating relay 379 to shut down the system in a manner that will be described. However if the code character having the third and fifth elements spacing is received, the circuit of relay 379 is not completed and the relay is not energized. Thus considering relay 275 which should have its armatures attracted to the left hand spacing contacts, under these conditions relay 275 connects positive battery through its right hand armature to the fifth conductor of the cable 311 and this circuit is extended through the inner armature and front contact of relay 308 and the switch wiper 266 and conductor 317 to positive battery, which circuit is independent of the winding of relay 379. However if relay 275 had been operated to marking, the circuit of relay 379 would have been completed through conductor 318, the right hand armature and marking contact of relay 275 and the fifth conductor of the cable 311 to battery on the first bank contact of the wiper 266 to energize relay 379. Similarly if relay 274 had been actuated to marking by the proper guard character pulse, the circuit of relay 379 would be connected through conductor 318, the right hand armature and marking contact of relay 274, the fourth conductor of cable 311, the second armature and make contact of relay 308, wiper 265 and its first bank contact back to the winding of relay 379, so that said relay is not operated. However if the relay 274 had been incorrectly actuated to spacing, positive battery at the right hand spacing contacts of said relay is connected through wiper 265 of the control switch to the winding of relay 379, whereupon the latter becomes energized to shut down the system. It will be apparent that similar circuits are provided in connection with the other receiving relays 272 and 273 of A channel to check the correct reception of the other elements of the guard character.

Assuming that the guard character is received correctly and relay 379 does not operate, at the end of the operating pulse from local segment 306, relay 308 becomes deenergized and the switch wipers 261—266 are stepped into engagement with their second bank contacts, as already described. Upon the next revolution of the distributor brushes, a circuit is closed through local segment 301, conductor 302, wiper 262 and its second bank contact to the negative locking terminal of the locking winding of relay 296 whereupon said relay becomes deenergized. A circuit is then closed during successive revolutions of the local brushes B6 from the local segment 306 through conductor 307, the inner left hand armature and back contact of relay 296, middle armature and back contact of relay 295 and the operating winding of relay 309 to negative battery whereupon the control switch wipers are stepped by the switch magnet 260 into engagement with their third contacts and then their fourth contacts as described above.

Upon the next revolution of the brushes of the multiplex distributor, assuming that the first subchannel is to be cut in, a blank will be received over B multiplex channel immediately preceding the pattern signal for the first group of subchannels. Upon this revolution the receiving control switch will be stepped from local segment 306 in the same manner as during the preceding cycle. A circuit is then closed upon the next revolution of the brushes of the distributor through local segment 301, conductor 302, switch wiper 262 in engagement with its fifth bank contact, conductor 303, the right hand armatures and spacing contacts of relays 280, 279, 278, 277 and 276, conductor 304 and the winding of relay 296 for operating said relay. The above described circuit is then closed from the local segment 306 for stepping the control switch and for operating relay 308 momentarily before the switch wipers step to their sixth bank contacts. The operation of relay 308 in the manner described above connects the contacts of the receiving relays of multiplex channel A through the cable 311 and the first four armatures of relay 308 to the wipers 263, 264, 265 and 266 of the control switch for operating the chain control relays in accordance with the pattern signal received on A channel.

Since the first subchannel has been cut out and is to be cut in, the chain control relay 290 is deenergized and the second element of the code received on A channel relay 272 is marking. Therefore a circuit is closed from the grounded wiper 261 of the control switch through its fifth bank contact, conductor 318, right hand marking contacts of relay 272, the second conductor of cable 311, the fourth armature and front contact of relay 308, wiper 263 and its fifth bank contact, conductor 319 and the windings of chain control relay 290 in series to positive battery whereupon relay 290 becomes energized. A locking circuit for relay 290 is closed through the right hand winding and the right hand inner armature and front contact of said relay to ground at the armature and back contact of relay 321. The operation of relay 290 effects the cutting in of the first subchannel receiving printer as described above.

If the subchannel had been cut in and was to be cut out in response to a spacing signal impressed upon receiving relay 272, the circuit for knocking down relay 290 may be traced from positive battery through the spacing contacts of relay 272 and the above described circuit to a terminal of the left hand winding of relay 290 which is locked up to ground through the above described circuit including its right hand winding. The application of positive potential to said terminal of the left hand winding of relay 290 effects the deenergization of the relay to cut out the subchannel.

At the end of the operating pulse from the local segment 306 which energized relays 308 and 309, the control switch is stepped to its sixth position. Upon the next revolution of the multiplex brushes, a circuit is closed to battery through local segment 322, the conductor 323, resistor 324, the right hand winding of relay 295, right hand outer armature and front contact of relay 296, and wiper 261 of the control switch to ground whereupon relay 295 becomes energized. The next switch stepping pulse from local segment 306 operates relay 308 without operating relay 309 to step the control switch since the circuit of relay 309 is interrupted at the contacts of relay 295. Thus the control switch remains stationary for a complete revolution of the multiplex distributor brushes in a similar manner to that described above in connection with the sending control switch. Previously however the confirmation signal on A multiplex channel has been checked with the operation of the chain control relays 290—293 which were operated in accordance with the previous pattern signal. The switch wipers of the receiving control switch were stepped into engagement with their sixth bank contacts immediately after any or all of the chain control relays 290—293 were operated by the pattern signal. If the confirmation signal is received properly, the polarity of the second, third, fourth and fifth elements of the code combinations on A multiplex channel will be reversed from that considered above in connection with the pattern signal. Thus with reference to receiving relay 272, during the confirmation signal this relay is operated to spacing thereby impressing positive battery on the second conductor of the cable 311, the fourth armature and front contact of relay 308 and switch wiper 263 which is now in engagement with its sixth bank contact. Positive battery is applied therefore through conductor 325 to the left hand armature and front contact of relay 290 which being also connected to positive battery is without effect.

Assuming, however, that the second pulse of the confirmation signal was received marking instead of spacing so that the pattern signal is not confirmed, relay 290 is energized. Upon the operation of relays 272 and 308 a circuit is closed from ground through the left hand armature and back contact of relay 378, left hand winding of relay 379, conductor 318, the marking contact and right hand armature of relay 272, second conductor of the cable 311, the fourth armature and front contact of relay 308, the switch wiper 263 in engagement with its sixth contact, conductor 325 and the left hand armature and front contact of relay 290 to positive battery whereupon relay 379 becomes energized to shut down the system in a manner to be described.

Similarly if the second impulse of the pattern signal had been spacing (to release relay 290 as described above) and the second impulse of the confirmation signal had been marking, no circuit would have been closed for the operation of relay 379 since this circuit through the left hand winding of relay 379, conductor 318, the marking contact and right hand armature of relay 272, second conductor of cable 311, fourth armature and front contact of relay 308, the switch wiper 263, the sixth bank contact and the conductor 325, is now extended through the left hand armature and back contact of relay 290 and conductor 327 to the conductor 318 so that no current traverses the winding of relay 379. If, however, the second impulse of the confirmation signal had been received spacing so that it did not confirm the marking impulse of the pattern signal, a circuit would have been closed for energizing relay 379 which may be traced from the upper terminal of the left hand winding of said relay through the conductor 327, left hand armature and back contact of relay 290, conductor 325, the wiper 263 of the control switch, fourth armature and front contact of relay 308, the second conductor of cable 311, and the right hand armature and spacing contact of relay 272 to positive battery, thereby energizing relay 379. Similar circuits are provided from the other receiving relays 273, 274 and 275 through the switch wipers 264, 265, 266 for operating relay 379 if the third, fourth or fifth pulses of the confirmation code signal do not check with the pattern signal or if the second, third, or fourth sub-channels are not properly in or out in response to the pulses of the pattern code signal.

It will be noted that relay 379, which may be termed the "pattern failure" relay, will not only be operated when the pattern and confirmation signals do not agree, that is, when the second, third, fourth and fifth pulses of the confirmation code are not of opposite polarity to those of the pattern code, but will also be operated if the sending and receiving control switches get out of step because of the failure to receive the initial blank associated with two related pattern and confirmation signals. This is accomplished by the reception of the second blank associated with the related pattern and confirmation signals which will, if the first blank normally preceding the pattern signal has not been received properly, cause the receiving circuits to read as a pattern signal a character which has not been transmitted as a pattern and as a confirmation signal a character which has not been transmitted as a confirmation, as the loss of the first blank, referred to above, has permitted the receiving switch to step without hesitation at a time when the sending switches have done so. The pattern failure relay 379 will also be operated in the event that a blank signal is received on B channel as a result of line or circuit trouble, when no blank has been transmitted from the transmitting station, or if a blank which is transmitted on B channel is distorted into a normal character so that the blank is not received and one of the control switches starts stepping while the other one remains at home. Thus the system will be shut down by the operation of relay 379 in response to several trouble conditions or failures, particularly those which are likely to cause lack of synchronism between the sending and receiving subchannels, since the variable pattern signals are accompanied by invariable control signals which must be correctly received. Obviously it is important to avoid accidental transmission from the transmitter of one subchannel to the printer of another subchannel or the condition wherein different numbers of transmitters and printers are connected to the system, and the means herein provided for this purpose is an important feature of the invention.

The pattern failure relay 379 is also operated to shut down the system in case no pattern signals are received for a predetermined time, such signals being normally transmitted in not less than a predetermined time interval even though no change in the subchannels has occurred as described above. During each step of the receiving control switch as described above, relay 309 becomes energized to operate the stepping magnet of the switch. The energization of relay 309 closes a circuit from negative battery through its left hand armature and front contact to the grid of the vacuum tube 385. The negative potential upon the grid of said tube normally renders the same non-conductive and because of the associated condenser and shunt leak resistance the grid remains negative for a predetermined time which is adjusted to be somewhat longer than the timing of the vacuum tube 154 at the sending station. A relay 386 is connected in the plate circuit of the vacuum tube 385 and therefore remains deenergized during the normal operation when pattern signals are received at frequent intervals. If however a pattern signal is not received for say twenty seconds, the vacuum tube 385 becomes conducting and causes the energization of relay 386 connected thereto. Upon the energization of relay 386 the circuit is closed from ground through the make-before-break contacts associated with the left hand contact spring of the key 390 and in parallel through the armatures and front contacts of relay 386 for lighting the signal lamp 387 and energizing the pattern failure relay 379. The lighting of the lamp 387 indicates that the receiving control switch has failed to step for a period longer than that set by the sending pattern control as described above, either by reason of failure of the switch itself or of the control signal transmitting or receiving apparatus. The energization of relay 379 stops transmission in a manner to be described in detail. When the system is to be restarted the key 390 is operated to interrupt the described circuits of relay 379 and of the lamp 387, and negative battery is connected through the right hand contacts of the key to the grid of the vacuum tube 385 to render the same non-conductive again. In this manner the failure to send any pattern control signals or the failure of the receiving control switch to respond to such signals is detected after a comparatively short time interval.

Following the reception of the pattern and confirmation signals if no further subchannels are to be cut in or cut out the switches will continue to step each time the brush crosses segment 306 until the home position is reached, whereupon relay 295 will be operated by a circuit from segment 322, through conductor 323, resistance 324, the right hand winding of relay 295, outer right hand armature and back contact of relay 296 to the first bank contact of level 261 to its wiper and to ground, thus operating relay 295 which locks through the same winding. The stepping circuit for the switch is opened at the second armature and back contact of relay 295 and the switch will remain at its home contacts until a blank is received on the B channel.

*Automatic and manual control of the system*

At the transmitting station relay 106 under the control of the home stop key 331 is effective to stop transmission from the transmitting station to the receiving station by cutting out the operative transmitting subchannels and to send a signal to the receiving station to cut out the receiving ends of the operative subchannels, thus stopping all transmission in one direction. When the key 331 is operated to the alternate position from that shown in the drawings, a circuit is closed from ground through the right hand spring and make contact of the key, the right hand outer armature and back contact of relay 106, conductor 340 and the resistor 341 to the grid of the vacuum tube 154, to render said tube conductive and initiate the transmission of a switching signal by the energization of relay 155 as described above in connection with closure of the common test circuit when a subchannel is to be cut in or out. The control switch at the transmitting station is stepped in the usual manner and a blank is sent on B channel to initiate the stepping of the receiving control switch. When the wiper 176 of the sending control switch reaches the second bank contact, a group test is applied in the usual manner, and in the third switch position when relay 212 is operated from local segment 184 of the transmitting distributor preliminary to stepping the control switch to the fourth position, a circuit is closed from positive battery through the third armature and front contact of relay 212, wiper 175 of the control switch and its third bank contact, conductor 342, the left hand spring and make contact of the key 331 and the left hand winding of relay 106 to negative battery whereupon relay 106 becomes energized and is locked up through its right hand winding, inner armature and front contact to ground. At the third position of the pattern switch, spacing potential is normally applied from ground through the second right hand armature and back contact of relay 106, the conductor 343, the third bank contact and wiper 165 of the pattern switch and the cable 191 to the fourth storage relay 64 of channel A, thereby energizing relay 64 to impress spacing potential on the fourth sending segment of the transmitting ring of the multiplex distributor. When the relay 106 becomes energized as described above, the ground is removed from the winding of relay 64 so that the fourth pulse of the pattern code is changed to marking. Thus if the home stop key 331 had been operated as described, a pattern signal would be sent following the usual guard character while the wipers of the sending and receiving control switches are in engagement with their third bank contacts. When the confirmation signal is sent, since relay 77 has been operated as above described, the spacing and marking potentials on A channel are reversed so that the confirmation signal will have the fourth impulse spacing. These pattern and confirmation signals disconnect the operative subchannels at the receiving station in a manner that will be described below.

The energization of relay 106 opens at its third right hand armature and back contact the above described circuit of relay 105, whereupon said relay becomes deenergized. The first C chain pulse from the local ring of the distributor is then diverted through the armature and back contact of relay 105, and the conductor 118 to the negative locking terminal of relay 123 and any connector relay which may be locked up at that moment, thus knocking down these relays to disconnect sub-channels from the C multiplex channel. The succeeding chain operating pulses are then applied to the locking terminals of guard relays 122 and 121 to disconnect the connected subchannels from the other multiplex channels and thereby stop all transmission from the transmitting station. A circuit is also closed through the third right hand armature and front contact of relay 106, the conductor 120, winding of relay 110, and the outer right hand armatures and front contacts of any of the chain control relays 90, 107, 108 or 109, which may be operated, whereupon relay 110 becomes energized and opens at its armature and back contact the locking circuit of said chain control relays to release the same. The deenergization of the chain control relays cuts out the transmitting ends of the subchannels as described above so that when transmission is resumed, the subchannels must be cut in with accompanying switching signals to cut in the receiving end of the corresponding subchannels.

When the pattern signal produced by the operation of key 331 as described above is received at the receiving station, relay 345 is operated in the same manner as the chain control relays 290 to 293 were operated in response to the pattern signal for the first group of subchannels. The operation of relay 345 lights the signal lamp 346 and effects the release of the operated connector chain relays and chain control relays at the receiving station in the same manner as the energization of relay 106 effected the release of the corresponding relays at the sending station. The lighting of the lamp 346 indicates to the attendant that transmission to his office has stopped.

When the key 331 is restored to normal, stepping of the control switches is restarted as described above and when the wiper 175 engages its third bank contact, a circuit is closed similar to that described above for operating relay 106, but by reason of the transfer of the contacts of the key 331, positive battery is now connected to the negative terminal of the locking winding of relay 106 and said relay becomes deenergized. When relay 106 is deenergized, the cut in control circuits are rendered operative and the subchannels which have traffic to send are cut in in the usual manner. The pattern signal which is transmitted over the circuit at this time is reversed from that described above in reference to the shutting down of the receiving station and is operative to release relay 345 since it will be effective to apply positive battery to the left hand winding of said relay. The deenergization of relay 345 permits the receiving subchannels to be cut in upon receipt of the pattern signals as described above.

Figure 4:
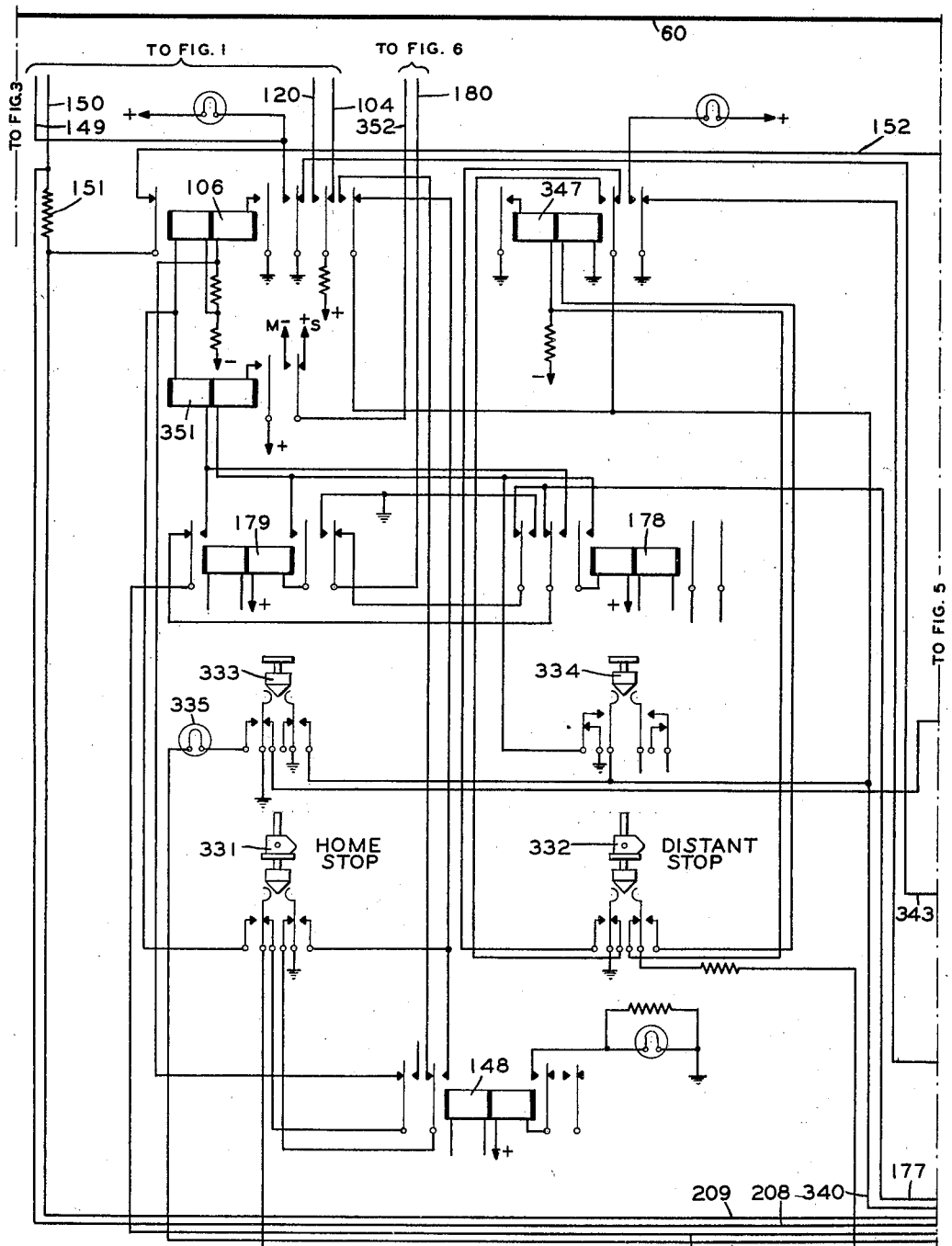
Figure 5:
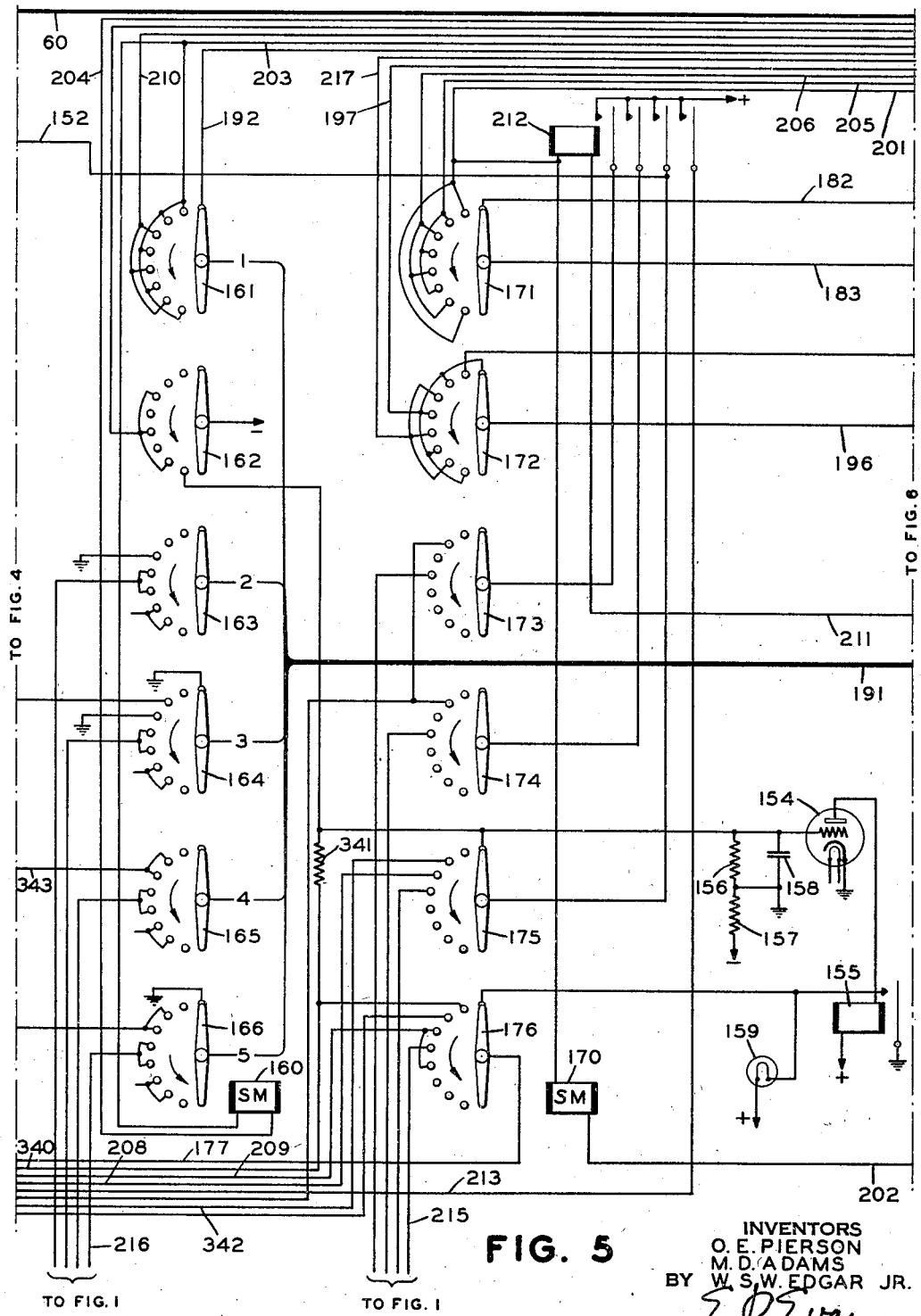
Figure 6:
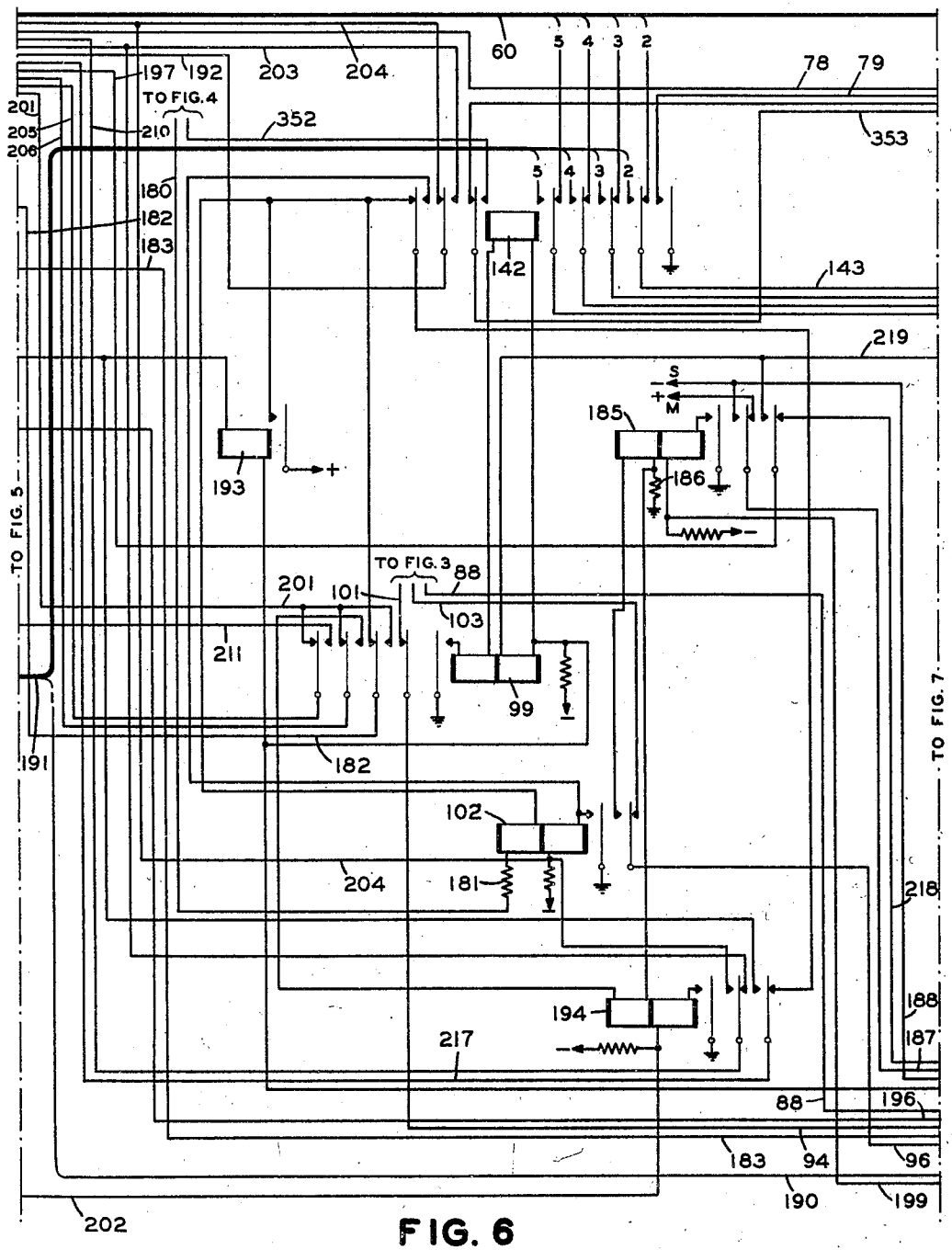
Figure 7:
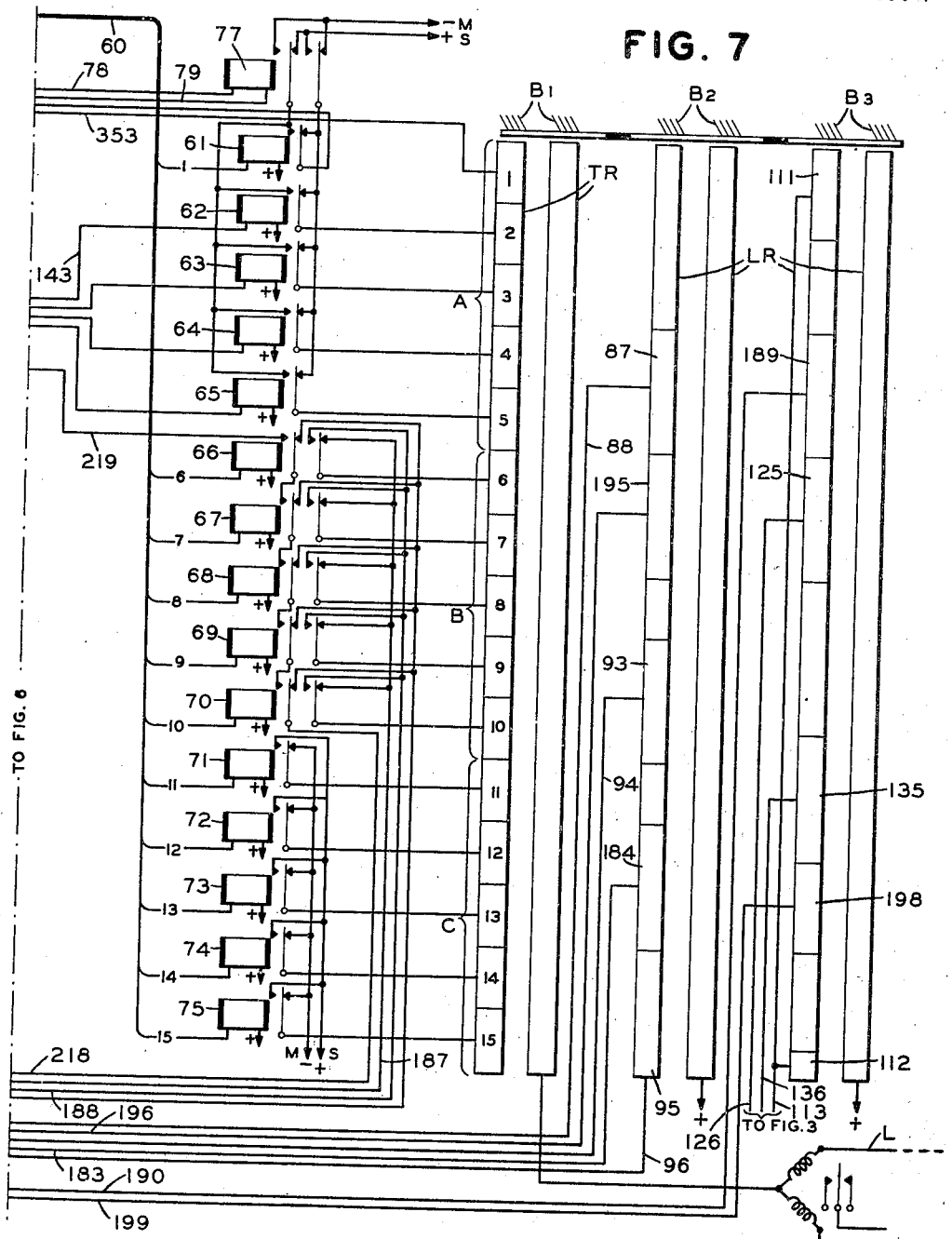

A distant stop key 332 is also provided to enable the attendant to stop transmission from the remote station. Thus the key 332, Fig. 4, is arranged to stop transmission from the transmitting apparatus at the station shown in Figs. 8 to 11, although as explained above, this apparatus being merely a duplication of that shown in Figs. 1 to 7 is not illustrated for the sake of simplicity. A similar distant stop key is provided at the second station for stopping transmission from the station shown in Figs. 1 to 7 to the second station.

The distant stop function may be readily understood from the schematic diagram of Fig. 12. The closure of the key 332 shown in this figure effects the operation of a relay 347 which is operative to transmit the pattern signal to the remote station and thereby operate a distant stop relay 348 in the same manner as the closure of the key 331 and the operation of relay 106 effected the operation of stop relay 345 as described above. Detailed circuits of the key 332 and relays 347 and 348 are shown in Figs. 1 to 11.

In order that a signal may be transmitted to call the attendant to the equipment at the distant terminal or for other purposes such as the indication of the operating condition of the system or the control of associated equipment a key 333 is provided. When operated it causes a pattern signal to be sent having its third pulse controlled directly by the position of the key 333. An indication that such a signal has been sent is obtained by a lamp 335 connected to the key and to the second bank contacts associated with wipers 173 and 174 which cause the lamp to be flashed when relay 212 is operated. The reception of the pattern signal at the third bank contacts associated with wiper 264, when such signal has its third pulse marking, causes the operation of relay 336 and operates a signal lamp 337 or other controls. The relay 336 may be released by the operation of a key 338 which opens the locking circuit.

The operation of relay 348 as indicated in Fig. 12 is effective to operate relay 106 in the same manner as though the stop key 331 had been operated. Accordingly the operative sub-channels at both ends of the system are cut out and transmission in one direction is stopped as described above in connection with the operation of the key 331. When relay 348 becomes energized, a signal lamp 349, Fig. 10, is lighted to indicate that transmission has been stopped by the operation of a distant stop key at the other office.

Fig. 13 illustrates the operations which result when a pattern failure occurs, operating relay 379 in any of the various manners described above. The operation of relay 379 as indicated diagrammatically in Fig. 13 operates relays 106a and 351a corresponding to relays 106 and 351 of Fig. 4. As we have seen, the operation of relay 106a stops transmission from the station where the pattern failure was detected which is the second station in the system shown, and the operation of relay 351a transmits a pattern signal to shut down the transmission from the remote station and to cause the immediate stopping of reception at the remote station. Thus as indicated in the drawings the operation of relay 178 operates relays 106 and 345a, the latter corresponding to relay 345, Fig. 10, which as we have seen stops reception at the local office. Similarly the operation of relay 106 stops transmission from the local office. The operation of relay 178 also operates relay 351 to transmit a pattern signal to the office at which the pattern failure occurred, operating relays 378 and 345, Fig. 10, to stop reception at said office.

The detailed circuits of the pattern failure relay 379 are shown in Figs. 4 to 11. Since this relay is operated in response to conditions at the receiving office and controls the operation of the transmitting control equipment arranged to send to the other office, the operating circuits which energize the pattern failure relay and which have already been described are shown in Figs. 8 to 11, and the transmission controlling circuits are shown in connection with the corresponding pattern failure relay 179, Fig. 4, at the other office. Assuming then that relay 179 has been operated by a failure, a circuit is closed from ground through the outer right hand armature and front contact of relay 179, the conductor 180 and resistor 181 for energizing relay 102 through the circuit which has been traced above in connection with the operation of relay 102 in response to a test pulse. The operation of relay 102 initiates the stepping of the control switches at the sending and receiving ends in the same manner as described above but in this case the pattern signal for every group is transmitted since ground potential remains on the test circuit through the operation of relay 179. During the cyclic operation of the control system a circuit is closed from positive battery through the outer armature and front contact of relay 212, the conductor 213, the left hand armature and front contact of relay 179 and the windings of relays 351 and 106 in series to negative battery thereby energizing relays 351 and 106. The energization of relay 106 disconnects the transmitting ends of the subchannels as described above. Relays 179 and 351 lock up through their right hand inner armatures and front contacts to ground at the left hand make-before-break contacts of key 334. The operation of relay 351 applies marking battery which is negative in the case of A channel through the outer armature and front contact of relay 351, the conductor 352, the inner left hand armature and front contact of relay 142 and the conductor 353 to the first segment of A channel of the multiplex. Thus the operation of relay 351 changes the polarity of the first segment of the transmitting ring of the distributor from normal spacing potential to marking potential when the relay 351 is operated by the pattern failure relay 179. The first impulse of each pattern signal is always spacing under normal conditions but as described, is changed to marking upon the occurrence of a pattern failure. Since a pattern signal is sent for each subchannel group under these conditions, a pattern signal will be sent immediately in which the first impulse is changed to marking irrespective of the positions of the control switches, i. e., whether they have already been stepped from the home position before the pattern failure occurred.

The manner in which the relay 178 is operated in response to this signal will be apparent from consideration of the operating circuit of the corresponding relay 378 shown on Figs. 8, 9 and 10. Thus when the first receiving relay 271 connected to the first segment of the receiving ring of the distributor is actuated to marking when the wipers of the receiving control switch 261 to 266 are in engagement with their third, fifth, and so forth, bank contacts, a circuit is closed from ground through the switch wiper 261, a third or fifth bank contact associated therewith, conductor 318, the right hand armature and marking contact of relay 271, first conductor of the cable 311, the outer armature and front contact of relay 308 and the conductor 355 to the left hand winding of relay 378 whereupon said relay becomes energized. The energization of relay 378 closes a circuit from ground through its left hand armature and front contact and the windings of relay 345 in series to positive battery whereupon relay 345 becomes energized. Referring now to Figs. 4, 5, 6 and 7, and assuming that relays 178 and 345a have been energized as set forth in connection with the corresponding relays 378 and 345, the operation of relay 345a stops reception at the local office. The detailed circuits are shown in connection with relay 345, Fig. 10, and it will be apparent that the operation of relay 345 energizes relay 321 to open the locking circuits of the chain control relays 290 to 293. The operation of relay 345 further opens at its second right hand armature and back contact the circuit of the chain release relay 305 corresponding to the chain release relay 105 of Fig. 1 which as set forth above releases the connector relay chain.

Referring again to Figs. 4 to 7, the operation of relay 178 closes a circuit for operating relay 106 which may be traced from said relay through the left hand winding of relay 351, the second left hand armature and front contact of relay 178, the left hand armature and back contact of relay 179, conductor 213 and the outer armature and front contact of relay 212 whereby relays 106 and 351 become energized. The operation of relay 106 releases the transmitting ends of the subchannels to stop transmission from the local office as described above. The operation of relay 351 as set forth above changes the first impulse of each pattern signal from spacing to marking. As already explained this pattern signal when received at the remote office causes the operation of relays 378 and 345 and thereby cuts out the receiving ends of the subchannels. Therefore it will be apparent that the operation of relay 379 is arranged to stop transmission in the system in both directions and that the timing of the control functions is such that the sending and receiving ends of the corresponding subchannels cut out at the same moment. However, on account of the possibility of an appreciable time lag in the transmission of signals between widely separated offices, the shutting down of the system occurs in two steps. Since the stopping of the reception at the office where the pattern failure was detected is delayed until a signal has been transmitted to the remote office to stop transmission from that office, the possibility of introducing errors or omitting the reception of characters is avoided.

Following a pattern failure, relays 106, 351, 179 and 178 may be released by operating key 334 which opens their locking circuits, thus permitting the circuit to be restarted.

Although a specific system has been shown and described in detail for the purpose of explaining the invention, it will be understood that the invention is not limited to this particular circuit arrangement or to the types of apparatus elements which are shown and described. Various modifications will occur to those skilled in the art and may be made without departing from the scope of the invention as defined in the appended claims.

We claim:

1. A multiplex telegraph system comprising a lane of traffic, a plurality of communication subchannels, each including transmitting and receiving apparatus, means for connecting subchannels to the lane of traffic for operation and for disconnecting the same therefrom, a multiple-contact control device controlling a plurality of circuits, means controlled thereby to transmit switching signals, each consisting of a code combination of impulses, and means including said connecting means and means for transmitting switching signals for controlling the operative or inoperative condition of a group of subchannels in response to the transmission of a single code combination.

2. A multiplex telegraph system comprising a lane of traffic, a plurality of communication subchannels each including transmitting and receiving apparatus, means for connecting operative subchannels to the lane of traffic, means for controlling said connecting means including a multiple-contact control device controlling a plurality of circuits and means controlled thereby to transmit switching control signals, each consisting of a code combination of impulses varying in accordance with the operative or inoperative condition of a group of subchannels, a receiving control device at the receiving end of the system, means for synchronously operating said control devices for transmitting and checking the accurate reception of a series of separate variable control signals bearing a predetermined relation to each other, and means for indicating a departure from said relation.

3. An expanding channel telegraph system comprising a lane of traffic, a plurality of subchannels each including transmitting and receiving apparatus, means for connecting operative subchannels to the lane of traffic and means for controlling said connecting means and transmitting a control signal to the receiving end of the system to cut the receiving end of the subchannels in or out, said last-mentioned means comprising a sequentially operated switch and means to control simultaneously a group of subchannels in each of several sequential positions of said switch.

4. An expanding channel telegraph system comprising a lane of traffic, a plurality of subchannels each including transmitting and receiving apparatus, means for connecting operative subchannels to the lane of traffic and means for controlling said connecting means including synchronously operated step-by-step control switches at opposite ends of the lane of traffic, means associated with the sending control switch for transmitting switching or pattern signals, each one of which consists of a code combination of impulses varying in accordance with the operative condition of the respective subchannels of a separate group of subchannels, and means associated with the receiving control switch and responsive to said signals for controlling the subchannels of a group simultaneously to cut in or out any of the group with respect to the lane of traffic.

5. An expanding channel telegraph system comprising a lane of traffic, a plurality of subchannels each including transmitting and receiving apparatus, means for connecting operative subchannels to the lane of traffic and means for controlling said connecting means including a step-by-step control device at the transmitting end of the lane of traffic, means including said control device for generating a series of control signals and thereby cutting the receiving apparatus of the respective subchannels in or out, the control signals possessing predetermined invariable characteristics and also variable characteristics depending upon the changes in subchannel operation, and means controlled by the invariable characteristics of the control signals to check the accurate transmission and reception of the signals.

6. In an expanding-channel telegraph system, means for transmitting switching control signals including at least one invariable character and at least two variable characters having an invariable relationship and means for checking the accurate transmission and reception of said switching control signals, said last-mentioned means comprising means responsive to the failure of an invariable character to compare random characters and means for indicating the failure of the random characters to possess the required invariable relationship.

7. In a multichannel telegraph system utilizing as switching control signals a series of code combinations, which have known or invariable as well as variable characteristics, the method of control which comprises checking the received code combinations for said known characteristics to determine the accuracy of transmission and utilizing the variable characteristics to control the switching of channels.

8. A multichannel telegraph system comprising a lane of traffic, a plurality of communication subchannels, each including transmitting and receiving apparatus, switching means for connecting operative subchannels to the lane of traffic including means to transmit a switching signal and an individual guard character to the receiving end of the system, receiving means for detecting the transmission of said individual guard character and means operatively associated with said receiving means for disconnecting all subchannels and stopping transmission.

9. A multiplex telegraph system comprising a lane of traffic, a plurality of communication channels, each including transmitting and receiving apparatus, means for connecting operative subchannels to the lane of traffic including means to transmit successive pattern and confirmation signals to cut the receiving end of a subchannel in or out, said pattern and confirmation signals normally bearing a predetermined relation to each other, means controlled by said signals to cut the receiving end of a subchannel in or out and means to check the predetermined relation of said pattern and confirmation signals as received.

10. A telegraph switching system comprising a lane of traffic, a plurality of receiving printers, connecting means to associate said printers with the lane of traffic, means for transmitting successive selection and confirmation signals bearing a predetermined relation, means to control said connecting means in accordance with said selection signals and means to signal the transmitting end of the system that the selection and confirmation signals as received do not bear said predetermined relation when one signal is mutilated in transmission.

11. A multi-channel telegraph system comprising a lane of traffic, a plurality of communication channels, each including transmitting and receiving apparatus, and means for connecting operative subchannels to the lane of traffic including means to transmit a pattern signal to cut the receiving end of a subchannel in or out and to transmit a signal immediately following said pattern signal to check the connection or disconnection of the subchannel in response to the pattern signal.

12. A multichannel telegraph system comprising a lane of traffic, a plurality of communication subchannels, each including transmitting and receiving apparatus, switching means for connecting operative subchannels to the lane of traffic including means to transmit a switching signal to the receiving end of the system and means to detect immediately the failure of the switching means to cut in one end of a subchannel when the other end of the same subchannel is cut in and to stop transmission upon such failure.

13. A multichannel telegraph system comprising a lane of traffic, a plurality of communication subchannels each including transmitting and receiving apparatus, means for connecting operative subchannels to the lane of traffic, means to control the subchannel connecting means associated with the receiving apparatus of said subchannels in response to received switching signals and means for transmitting a stopping signal in both directions upon the occurrence of the failure of a switching signal.

14. A multichannel telegraph system comprising a lane of traffic, a plurality of communication subchannels each including transmitting and receiving apparatus, means for connecting operative subchannels to the lane of traffic, means for controlling said connecting means including means to transmit switching signals when subchannels are to be cut in or out, and means for stopping transmission in both directions in response to a predetermined control signal in such manner that the operative transmitting subchannels are disconnected without mutilated transmission or loss of characters.

15. A multichannel telegraph system comprising a lane of traffic, a plurality of subchannels each including transmitting and receiving apparatus, means for connecting operative subchannels to the lane of traffic, means for controlling said connecting means for receiving subchannel apparatus in response to switching signals, means to detect failure of the control means or in the transmission of switching signals, means to transmit repeatedly a stop signal in case of such failure and means responsive to the stop signal to disconnect the operative receiving subchannel apparatus from the lane of traffic.

16. A multichannel telegraph system comprising a lane of traffic, a plurality of storage transmitters, means for connecting the transmitters to said lane of traffic when normal characters are waiting transmission on each subchannel, means for stepping blank characters through the transmitters before connecting the same to the lane of traffic, said stepping means including a retarded electro-responsive device connected to a plurality of the contacts of each transmitter and means responsive to the first normal character in any transmitter for rendering said connecting means operative.

17. In an expanding channel system wherein a plurality of subchannels share a common lane of traffic and embodying switching means responsive to a pattern signal for connecting operative subchannels to the system, means for transmitting successive pattern signals at not less than a predetermined time interval and means operated by the failure to receive a pattern signal for said time interval to stop the operation of the system.

18. In an expanding channel system wherein a plurality of subchannels share a common lane of traffic and embodying switching means at the receiving end for controlling receiving subchannels, means for transmitting control pattern signals to control said switching means as transmitting subchannels are cut in or out of the system and also corresponding confirmation signals accompanying the pattern signals, means for translating system or circuit failures into apparent failures of pattern or confirmation signals and means for stopping transmission over all subchannels upon the occurrence of such apparent failures of pattern or confirmation signals.

19. A multichannel telegraph system comprising a lane of traffic, a plurality of communication subchannels each including transmitting and receiving apparatus, connecting means for rendering subchannels operative over the lane of traffic and means to control said connecting means whenever the subchannels have anything to transmit, said last-mentioned means including a common test circuit, a step-by-step control switch, means including said common test circuit for initiating the operation of said control switch, group test means including the bank contacts of said control switch for finding the particular group of which one or more subchannels is to be cut in and means for thereafter transmitting a pattern signal consisting of a code combination representing the active or inactive condition of the subchannels of said particular group.

20. A multichannel telegraph system comprising a lane of traffic, a plurality of communication subchannels each including transmitting and receiving apparatus, connecting means for rendering subchannels operative over the lane of traffic and means to control said connecting means whenever the subchannels have anything to transmit, said last-mentioned means including a common test circuit, a step-by-step control switch, means including said common test circuit for initiating the operation of said control switch, group test means including the bank contacts of said control switch for finding the particular group of which one or more subchannels is to be cut in, means for thereafter transmitting an invariable control signal accompanied by the pattern signal, said pattern signal consisting of a code combination representing the active or inactive condition of the subchannels of said particular group, means for checking the accurate transmission of said invariable signal and selectively operable circuit-closing means responsive to the code combination which forms the pattern signal for said particular group of subchannels.

21. A multichannel telegraph system comprising a lane of traffic, a plurality of communication subchannels each including transmitting and receiving apparatus, connecting means for rendering subchannels operative over the lane of traffic and means to control said connecting means whenever any of the subchannels has anything to transmit, said last-mentioned means including a step-by-step control switch, means for initiating the operation of said control switch and means including said control switch for transmitting a pattern signal and a confirmation signal having a predetermined relation to each other when the control switch has reached a position corresponding to a group of subchannels of which one or more subchannels is to be cut in, and means for comparing the pattern and confirmation signals as received.

22. A multichannel telegraph system comprising a lane of traffic, a plurality of communication subchannels each including transmitting and receiving apparatus, connecting means for rendering subchannels operative over the lane of traffic and means to control said connecting means whenever any of the subchannels has anything to transmit, said last-mentioned means including sending and receiving control switches one at each end of the lane of traffic, means for initiating the operation of the sending control switch, means including said sending control switch for transmitting a blank or all-spacing code combination over the lane of traffic followed by a pattern signal consisting of a code combination representing the active or inactive condition of the subchannels in the particular group of subchannels corresponding to the position reached by the sending control switch and means including the receiving control switch at the receiving end of the system for variably operating the connecting means associated with the receiving apparatus at the receiving end of the lane of traffic in response to said blank and pattern signals.

23. A multichannel telegraph system comprising a lane of traffic, a plurality of communication subchannels each including transmitting and receiving apparatus, connecting means for rendering subchannels operative over the lane of traffic and means to control said connecting means whenever any of the subchannels has anything to transmit, said last-mentioned means including sending and receiving control switches one at each end of the lane of traffic, means for initiating the operation of the sending control switch, means including said sending control switch for transmitting a blank or all-spacing code combination over the lane of traffic followed by two switching control signals, one of said switching control signals consisting of a pattern code representing the active or inactive condition of the subchannels in the particular group of subchannels corresponding to the position reached by the sending control switch, the other of said switching control signals consisting of a checking code combination bearing a predetermined relation to the first-mentioned pattern code, means including the receiving control switch at the receiving end of the system for variably operating the connecting means associated with the receiving apparatus at the receiving end of the lane of traffic if the received pattern and checking code combinations bear said predetermined relation and for stopping operation of the system if said code combinations fail to bear said predetermined relation.

24. A multichannel telegraph system comprising a lane of traffic, a plurality of communication subchannels each including transmitting and receiving apparatus, connecting means for rendering subchannels operative over the lane of traffic and means to control said connecting means whenever any of the subchannels has anything to transmit, said last-mentioned means including sending and receiving control switches one at each end of the lane of traffic, means for initiating the operation of the sending control switch, control relays at each end of the lane of traffic, means including said control switches for operating said relays to cut in the transmitting and receiving ends of the respective subchannels, means for transmitting a pattern signal and a confirmation signal to control said relays at the receiving end of the system when subchannels are cut in at the sending end of the system, said pattern signal consisting of a code identifying the subchannel to be cut in and the confirmation signal consisting of a code bearing a predetermined relation to its accompanying pattern signal, and means for preventing the operation of the control relays to cut in a subchannel when the received pattern and confirmation signals do not bear said predetermined relation.

25. A multichannel telegraph system comprising a lane of traffic, a plurality of communication subchannels each including transmitting and receiving apparatus, connecting means for rendering subchannels operative over the lane of traffic and means to control said connecting means whenever any of the subchannels has anything to transmit, said last-mentioned means including sending and receiving control switches one at each end of the lane of traffic, means for initiating the operation of the sending control switch, means for thereafter initiating the operation of the receiving control switch, means including said control switches for transmitting and reading signals, each consisting of a code representing the active or inactive condition of at least one subchannel, means for altering the normal movement of the control switches when a pattern signal is transmitted and means responsive thereto for detecting the failure of a control signal.

26. A multichannel telegraph system comprising a lane of traffic, a plurality of communication subchannels including transmitting and receiving apparatus, means for connecting subchannels when active to the lane of traffic, means to control said connecting means whenever any of the subchannels has anything to transmit and means to stop transmission over the system, said control means including means for transmitting pattern signals consisting of code combinations identifying the subchannels to be cut in, means for including in any code combination a stop signal, and means responsive to said stop signal for rendering said means to stop transmission operative.

27. In a multichannel telegraph system comprising a bank of sending relays having contacts controlling transmission of marking and spacing signals and means for transmitting channel switching pattern signals, means for transmitting a confirmation signal following each pattern signal, said last-mentioned means comprising means to reverse the polarity of the transmitting contacts of said sending relays, and means for operating said polarity-reversing means whenever a pattern signal is sent.

28. A multichannel telegraph system comprising a lane of traffic, a plurality of tape transmitters, each of said transmitters comprising marking and spacing bus bars, means for connecting said transmitters to said lane of traffic, periodic circuit-controlling means for stepping the tape through each transmitter and means for rendering said stepping means operative without connecting a transmitter to the lane of traffic as long as blank or non-functional character code combinations appear in the tape at the transmitter, said last-mentioned means including a relay connected to the marking bus bar of each transmitter whereby it differentiates between an all-spacing code combination and all other code combinations.

OSCAR E. PIERSON.
MYRON D. ADAMS.
WILLIAM STANLEY
WESTERMAN EDGAR, Jr.